US009144017B2

(12) United States Patent
Samanta Singhar et al.

(10) Patent No.: US 9,144,017 B2
(45) Date of Patent: Sep. 22, 2015

(54) SYSTEMS AND METHODS FOR SAVING POWER IN MONITORING AND TRACKING DEVICES

(71) Applicant: QUALCOMM Incorporated, San Diego, CA (US)

(72) Inventors: Anil Ranjan Roy Samanta Singhar, San Diego, CA (US); Arild Torvaldson Kolsrud, San Diego, CA (US); Tarali Bora, Santa Clara, CA (US)

(73) Assignee: Qualcomm Incorporated, San Diego, CA (US)

( * ) Notice: Subject to any disclaimer, the term of this patent is extended or adjusted under 35 U.S.C. 154(b) by 140 days.

(21) Appl. No.: 13/828,840

(22) Filed: Mar. 14, 2013

(65) Prior Publication Data

US 2014/0269467 A1    Sep. 18, 2014

(51) Int. Cl.
*H04J 3/00* (2006.01)
*H04W 52/02* (2009.01)

(52) U.S. Cl.
CPC ...... *H04W 52/0225* (2013.01); *H04W 52/0251* (2013.01); *H04W 52/0258* (2013.01); *Y02B 60/50* (2013.01)

(58) Field of Classification Search
CPC ........... H05B 37/0272; H05B 33/0854; H05B 33/0803; H05B 33/0815
See application file for complete search history.

(56) References Cited

U.S. PATENT DOCUMENTS

| 5,012,113 | A | 4/1991 | Valentine et al. | |
|---|---|---|---|---|
| 6,259,372 | B1 | 7/2001 | Taranowski et al. | |
| 8,446,046 | B2 * | 5/2013 | Fells et al. | 307/104 |
| 8,677,802 | B2 * | 3/2014 | Hower et al. | 73/12.01 |
| 8,743,275 | B1 * | 6/2014 | Han | 348/371 |
| 2011/0119522 | A1 * | 5/2011 | Leussink | 713/600 |
| 2011/0172832 | A1 * | 7/2011 | Kirby et al. | 700/278 |
| 2011/0181399 | A1 | 7/2011 | Pollack et al. | |
| 2012/0262069 | A1 * | 10/2012 | Reed | 315/130 |
| 2012/0289224 | A1 * | 11/2012 | Hallberg et al. | 455/424 |
| 2013/0121176 | A1 * | 5/2013 | Addepalli et al. | 370/252 |
| 2013/0142136 | A1 * | 6/2013 | Pi et al. | 370/329 |

FOREIGN PATENT DOCUMENTS

GB        2486008 A     6/2012
WO   2011117718 A1     9/2011

* cited by examiner

*Primary Examiner* — Fan Ng
(74) *Attorney, Agent, or Firm* — Knobbe, Martens, Olson & Bear, LLP

(57) ABSTRACT

This disclosure provides systems, methods and apparatus for wireless data communication. In one aspect, a device communicates with a base station. The device comprises a circuit configured to generate energy based on an environmental input. The device further comprises a storage device configured to store the energy. The device further comprises a clock circuit configured to generate a clock signal. The clock circuit is configured to power on during an active state of the device and power off during a sleep state of the device. The device further comprises a trigger circuit configured to generate a trigger signal that transitions the device into the active state when a level of the energy stored reaches a threshold value. The device further comprises a transmitter configured to transmit a message to the base station in response to generation of the trigger signal.

32 Claims, 20 Drawing Sheets

SYSTEMS AND METHODS FOR SAVING POWER IN MONITORING AND TRACKING DEVICES

FIELD

The present invention relates generally to wireless data communication. More specifically, the disclosure is directed to saving power in wireless monitoring and tracking devices.

BACKGROUND

Devices, such as tracking or monitoring devices, communicate wirelessly with a base station. Periodically, these devices gather information from sensors and transmit this information to the base station. Information gathered by the sensors may include a location, a heartbeat, a sugar level, and the like. To conserve power, the devices often enter a sleep mode when not gathering information and communicating with the base station. A clock or timer may be used by a device to determine when to gather information and communication with the base station and when to enter the sleep mode. However, the clock or timer consumes a non-zero amount of power and a non-zero amount of circuitry. Thus, the clock or timer limits an amount of power that can be conserved by a device and increases the size of the device.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a device for communicating with a base station. The device comprises a circuit configured to generate energy based on an environmental input. The device further comprises an energy storage device coupled to the circuit and configured to store the energy. The device further comprises a clock circuit configured to generate a clock signal. The clock circuit may be configured to be powered on during an active state of the device and configured to be powered off during a sleep state of the device. The device further comprises a trigger circuit coupled to the energy storage device. The trigger circuit may be configured to generate a trigger signal that transitions the device from the sleep state into the active state when a level of the energy stored in the energy storage device reaches a threshold value. The device further comprises a transmitter coupled to the clock circuit. The transmitter may be configured to receive the clock signal and transmit a message to the base station in response to the generation of the trigger signal.

Another aspect of the disclosure provides a method of communicating with a base station. The method comprises generating energy based on an environmental input. The method further comprises storing the energy in an energy storage device. The method further comprises generating a clock signal when a clock circuit is powered on. The clock circuit may be configured to be powered on during an active state and configured to be powered off during a sleep state. The method further comprises generating a trigger signal to operate in the active state when a level of the energy stored in the energy storage device reaches a threshold value. The method further comprises transmitting a message to the base station based on the clock signal in response to the generating the trigger signal.

Another aspect of the disclosure provides an apparatus for communicating with a base station. The apparatus comprises means for generating energy based on an environmental input. The apparatus further comprises means for storing the energy. The apparatus further comprises means for generating a clock signal when the means for generating the clock signal is powered on. The means for generating the clock signal may be configured to be powered on during an active state of the apparatus and configured to be powered off during a sleep state of the apparatus. The apparatus further comprises means for generating a trigger signal that transitions the apparatus from the sleep state into the active state when a level of the energy stored in the means for storing the energy reaches a threshold value. The apparatus further comprises means for transmitting a message to the base station based on the clock signal in response to generation of the trigger signal.

Another aspect of the disclosure provides a non-transitory computer-readable medium comprising code that, when executed, causes an apparatus to generate energy based on an environmental input. The medium further comprises code that, when executed, causes an apparatus to store the energy in an energy storage device. The medium further comprises code that, when executed, causes an apparatus to generate a clock signal when a clock circuit is powered on. The clock circuit may be configured to be powered on during an active state of the apparatus and configured to be powered off during a sleep state of the apparatus. The medium further comprises code that, when executed, causes an apparatus to generate a trigger signal to transition the apparatus from the sleep state into the active state when a level of the energy stored in the energy storage device reaches a threshold value. The medium further comprises code that, when executed, causes an apparatus to transmit a message to a base station based on the clock signal in response to generation of the trigger signal.

Another aspect of the disclosure provides a device for communicating with a base station. The device comprises a circuit configured to generate energy based on at least one of motion of the device or ambient light. The device further comprises an energy storage device coupled to the circuit and configured to store the energy. The device further comprises a clock circuit configured to generate a clock signal. The clock circuit may be configured to operate at a first power level during an active state of the device and configured to operate at a second power level that is less than the first power level during a sleep state of the device. The device further comprises a trigger circuit coupled to the energy storage device. The trigger circuit may be configured to generate a trigger signal that transitions the device from the sleep state into the active state when a level of the energy stored in the energy storage device reaches a threshold value. The device further comprises a transmitter configured to transmit a message to the base station in response to the generation of the trigger signal.

Another aspect of the disclosure provides a base station for communicating with a device. The base station comprises a receiver configured to scan for a first incoming message at a first time instant for a first duration of time. The base station further comprises a processor configured to set a second time instant for scanning for a second incoming message. The second time instant may be based on a time of arrival of the first incoming message and a first offset in connection with reception of the first incoming message within the first duration of time. The first offset may be based on a minimum duration of time between successive transmissions of messages by the device. The second time instant may be based on a time at the end of the first duration of time and a set offset in connection with no reception of the first incoming message within the first duration of time. The second offset may be based on a minimum of the minimum duration of time between successive transmissions of messages by the device and a maximum duration of time that the device is expected to page the base station in order to establish a connection.

Another aspect of the disclosure provides a device for communicating with a base station. The device comprises a receiver configured to detect a request signal transmitted by the base station. The request signal may comprise a request for information determined by the device when the device is powered on. The device further comprises a circuit configured to generate energy based on an environmental input. The device further comprises an energy storage device coupled to the circuit and configured to store the energy. The device further comprises a trigger circuit coupled to the energy storage device. The trigger circuit may be configured to generate a trigger signal when a level of the energy stored in the energy storage device reaches a threshold value. The device further comprises a logical element coupled to the receiver and the trigger circuit. The logical element may be configured to generate an activation signal when the request signal is received and the trigger signal is generated at a same time. The activation signal may be configured to power on the device. The device further comprises a transmitter configured to transmit the information to the base station when the device is powered on.

Another aspect of the disclosure provides a device for communicating with a base station. The device comprises a circuit configured to generate energy based on an environmental input. The device comprises an energy storage device coupled to the circuit and configured to store the energy. The device comprises a trigger circuit coupled to the energy storage device. The trigger circuit may be configured to generate a trigger signal when a level of the energy stored in the energy storage device reaches a threshold value. The device further comprises a transmitter coupled to the trigger circuit and configured to transmit a pulse signal to the base station. The base station may comprise a receiver. The base station may power on the receiver in response to receiving the pulse signal.

Figure 1:
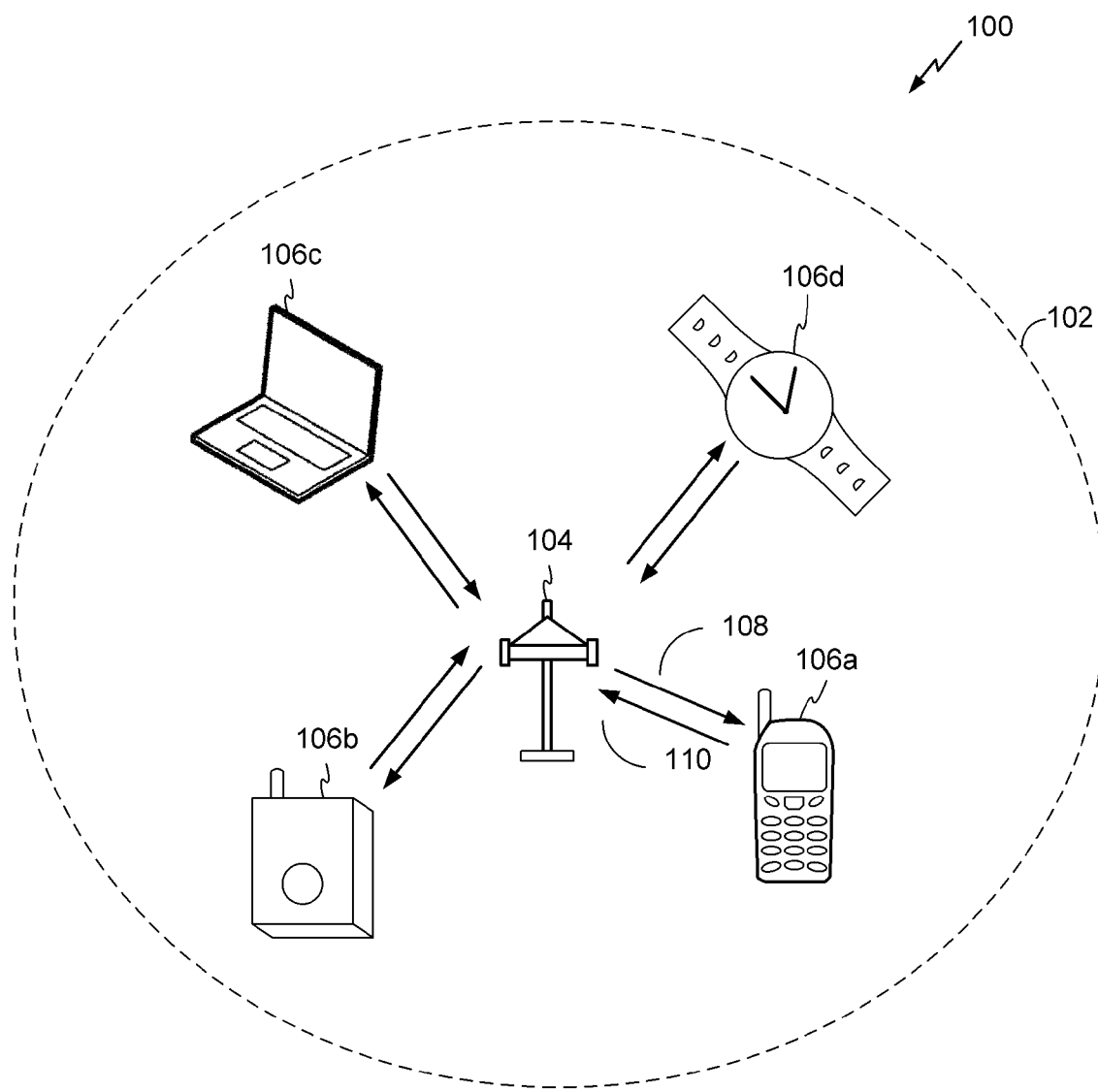
FIG. 1 shows an exemplary wireless communication system in which aspects of the present disclosure may be employed.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals in a sub-gigahertz band may be transmitted according to an IEEE 802.11 protocol using orthogonal frequency-division multiplexing (OFDM), direct-sequence spread spectrum (DSSS) communications, a combination of OFDM and DSSS communications, or other schemes. In other aspects, wireless signals in a super-gigahertz band may be transmitted according to a global positioning system (GPS) protocol. Implementations of the IEEE 802.11 protocol or the GPS protocol may be used for sensors, monitoring services, tracking services, and/or the like. Advantageously, aspects of certain devices implementing the 802.11ah protocol or the 802.11ac protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points ("APs") and clients (also referred to as stations, or "STAs"). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi (e.g., IEEE 802.11 protocol) compliant wireless link or a GPS compliant wireless link to obtain general connectivity to the Internet or to other wide area networks. In some implementations an STA may also be used as an AP.

An access point ("AP") may also comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, a satellite, or some other terminology.

A station "STA" may also comprise, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, certain of the devices described herein may implement an IEEE 802.11 protocol or a GPS protocol, for example. Such devices, whether used as an STA or AP or other device, may be used for monitoring vitals or tracking objects or living beings. Such devices may provide sensor applications as well.

FIG. 1 shows an exemplary wireless communication system 100 in which aspects of the present disclosure may be employed. The wireless communication system 100 may operate pursuant to a wireless standard, for example an IEEE 802.11 standard or a GPS standard. The wireless communication system 100 may include an AP 104, which communicates with STAs 106.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system. Alternatively, signals may be sent and received between the AP 104 and the STAs 106 in accordance with CDMA techniques. If this is the case, the wireless communication system 100 may be referred to as a CDMA system. Alternatively, signals may be sent and received between the AP 104 and the STAs 106 in accordance with GPS techniques. If this is the case, the wireless communication system 100 may be referred to as a GPS system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

The AP 104 may transmit a beacon signal (or simply a "beacon"), via a communication link such as the downlink 108, to other nodes STAs 106 of the system 100, which may help the other nodes STAs 106 to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information both common (e.g. shared) amongst several devices, and information specific to a given device.

In some aspects, a STA 106 may be required to associate with the AP 104 in order to send communications to and/or receive communications from the AP 104. In one aspect, information for associating is included in a beacon broadcast by the AP 104. To receive such a beacon, the STA 106 may, for example, perform a broad coverage search over a coverage region. A search may also be performed by the STA 106 by sweeping a coverage region in a lighthouse fashion, for example. After receiving the information for associating, the STA 106 may transmit a reference signal, such as an association probe or request, to the AP 104. In some aspects, the AP 104 may use backhaul services, for example, to communicate with a larger network, such as the Internet or a public switched telephone network (PSTN).

Figure 2:
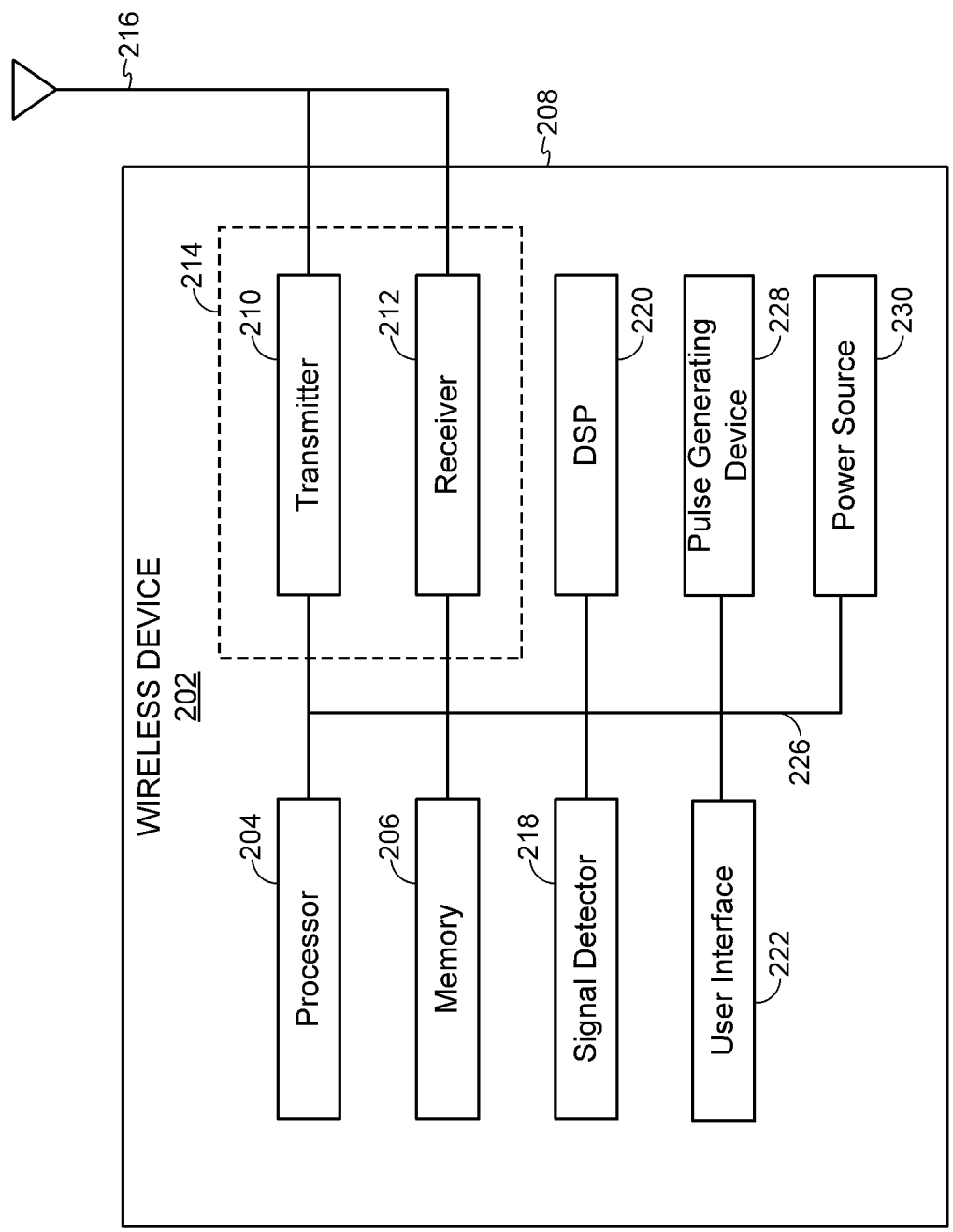
FIG. 2 shows a functional block diagram of an exemplary wireless device that may be employed within the wireless communication system of FIG. 1.

FIG. 2 shows an exemplary functional block diagram of a wireless device 202 that may be employed within the wireless communication system 100 of FIG. 1. The wireless device 202 is an example of a device that may be configured to implement the various methods described herein. For example, the wireless device 202 may comprise the AP 104 or one of the STAs 106. Although a number of components are illustrated in FIG. 2, those of skill in the art will recognize that the components are optional as the wireless device 202 may include some or all of the components illustrated and/or other components that are not illustrated.

The wireless device 202 may include a processor 204 which controls operation of the wireless device 202. The processor 204 may also be referred to as a central processing unit (CPU). Memory 206, which may include both read-only memory (ROM) and random access memory (RAM), may provide instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and/or a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a packet for transmission. In some aspects, the packet may comprise a physical layer data unit (PPDU).

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The wireless device 202 may further comprise an pulse generating device 228 in some aspects. The pulse generating device 228 may include components to generate energy from external motion of the wireless device 202, from ambient light, and/or the like. The pulse generating device 228 is described in more detail below with respect to FIGS. 3-6.

The wireless device 202 may further comprise a power source 230 (e.g., a battery) in some aspects. The power source 230 may provide power to one or more components of the wireless device 202.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 2, those of skill in the art will recognize that one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 2 may be implemented using a plurality of separate elements.

The wireless device 202 may comprise an AP 104 or an STA 106 and may be used to transmit and/or receive communications. That is, either AP 104 or STA 106 may serve as transmitter or receiver devices. Certain aspects contemplate signal detector 218 being used by software running on memory 206 and processor 204 to detect the presence of a transmitter or receiver.

As discussed above, a tracking or monitoring device may periodically wake-up from a sleep state to gather information and communicate with a base station. A tracking or monitoring device may be a geo-location device that attaches to the collar of a pet or that can be worn by a person. A conventional tracking or monitoring device may include circuitry that generates a periodic trigger signal used to wake-up the device during periods in which information is to be gathered and transmitted to the base station. Generally, the circuitry that generates the periodic trigger signal is a clock or timer that consumes power from a battery of the device. The battery life of a tracking or monitoring device thus may be extended if trigger signals are not derived from the clock or timer and/or if the clock or timer is powered on only when new information (e.g., a new location) is available and kept powered on only until the new information is transmitted to a base station.

However, it may be difficult to simply eliminate the clock or timer or only enable it during periods in which information is gathered and communicated. Often, a tracking or monitoring device needs a clock or timer to continuously operate so that the device can keep track of a current time. The tracking or monitoring device may need to keep track of the current time in order to in order to synchronize with an AP, such as a GPS satellite (e.g., the device may need to keep track of the current time in order to know when to wake up to receive messages from an AP).

In an embodiment, a tracking or monitoring device and an AP are designed such that the clock or timer is enabled only during periods in which information is gathered and communicated while still allowing the tracking or monitoring device to synchronize with the AP. In particular, the circuitry that generates a trigger signal may be designed such that it does not consume any power from the battery of the device. For example, the trigger generating circuitry may include components that allow the device to harness energy from the local environment (e.g., motion generating kinetic energy) to generate an electrical pulse. Thus, the need to draw any power from the battery may be eliminated, thereby allowing the other components of the device to completely power off. In those use cases in which the device is powered off by decoupling the battery from the trigger generating circuitry, the wall clock time information (e.g., the information that may be required when the device synchronizes with the AP, such as a GPS satellite) may be obtained from the base station after a connection is established. Once the wall clock time (e.g., the time of the day) is obtained in this way, the wall clock time can be maintained by keeping the clock or timer local to the device powered on for as long as required (e.g., until the entire process of collecting information, such as position, sensor measurements, and/or the like, and transmitting this information to the base station is complete). After the necessary information has been successfully transmitted to the base station, the device, including the local clock or timer, may be powered off. In this way, the need to maintain the wall clock time by operating a local clock or timer may be eliminated.

Figure 3:
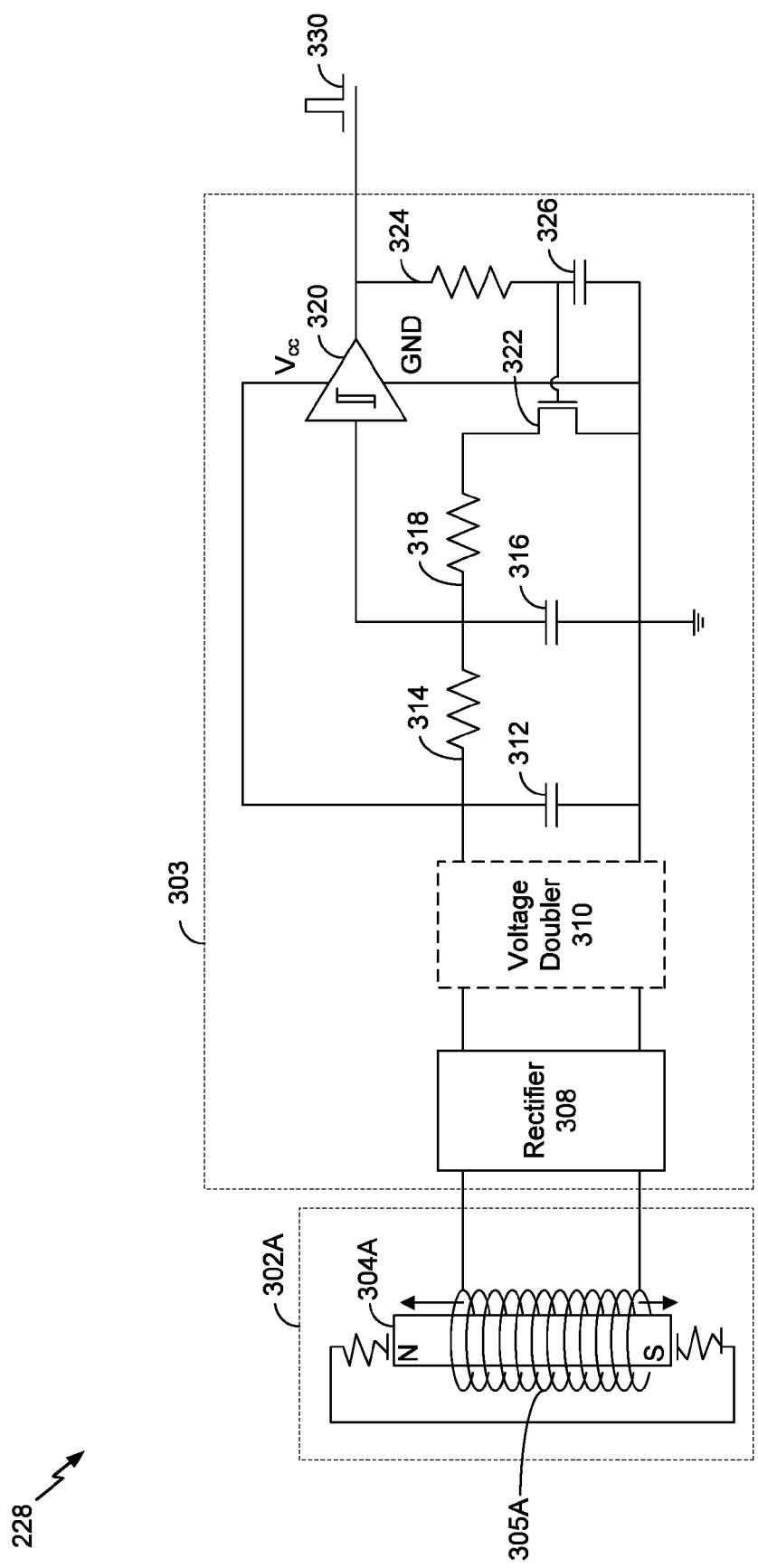
FIG. 3 is a block diagram of the pulse generating device of FIG. 2.

FIG. 3 is a block diagram of the pulse generating device 228 of FIG. 2. As illustrated in FIG. 3, the pulse generating device 228 may include an energy generation block 302A and a pulse generator 303. As used herein, the circuitry that generates the trigger signal is referred to as the pulse generating device 228 and a tracking or monitoring device is referred to as the STA 106. As described above, the STA 106 may include the components of the wireless device 202 and may be configured to communicate with the AP 104.

In an embodiment, the energy generation block 302A includes a coil 305A and a movable magnet 304A (e.g., a spring-mounted neodymium magnet). For example, the magnet 304A may be spring-mounted and located concentrically inside the coil 305A. The magnet 304A may be configured to oscillate side-to-side inside the coil 305A when the STA 106 is in motion. For example, the STA 106 may be used to track a pet or person or monitor the vital signs of a person engaging in an activity (e.g., running, exercising, checking insulin, etc.), and any movement by the pet or person may cause the magnet 304A to oscillate. The oscillating motion of the magnet 304A may induce a current in the coil 305A. The induced current (e.g., alternating current (AC)) may be sent to a rectifier 308, where the rectifier 308 is configured to convert the induced current from AC to direct current (DC).

In an embodiment, the pulse generator 303 may include the rectifier 308, a voltage doubler 310, a first tuning capacitor 312, a first tuning resistor 314, a charging capacitor 316, a resistor 318, a trigger 320 (e.g., a Schmitt trigger), a switch 322 (e.g., a transistor such as a MOSFET, etc.), a second tuning resistor 324, and/or a second tuning capacitor 326. In an embodiment, the DC produced by the rectifier 308 is optionally sent to the voltage doubler 310. The voltage doubler 310 may be configured to increase the voltage produced by the coil 305A and magnet 304A such that it the voltage is at a level sufficient to eventually generate a trigger signal 330.

The output of the voltage doubler 310 (e.g., if the voltage doubler 310 is present) or the output of the rectifier 308 (e.g., if the voltage doubler 310 is not present) may be coupled in series with the first tuning capacitor 312, the first tuning resistor 314, the charging capacitor 316, the resistor 318, the trigger 320, the switch 322, the second tuning resistor 324, and/or the second tuning capacitor 326. For example, the output may be coupled to the trigger 320 and serve as a supply voltage for the trigger 320.

The first tuning capacitor 312 may be coupled in parallel with the first tuning resistor 314 and the supply voltage of the trigger 320. The first tuning capacitor 312 may be coupled between the output of the voltage doubler 310 or the rectifier 308 and ground. The first tuning resistor 314 may be in series with the resistor 318, the switch 322, an input of the trigger 320, and the charging capacitor 316. The resistor 318, the input of the trigger 320, and the charging capacitor 316 may be in parallel with each other.

In an embodiment, the charging capacitor 316 is coupled between the first tuning resistor 314, the resistor 318, and the input of the trigger 320 and ground. The resistor 318 may be in series with the switch 322, and the switch 322 may be coupled between the resistor 318 and ground.

An output of the trigger 320 may be coupled in series with the rest of the circuitry of the STA 106 (e.g., the other components of the wireless device 202 via the bus system 226), the second tuning resistor 324, and the second tuning capacitor 326. The output of the trigger 320 may generate the trigger signal 330. The second tuning resistor 324 may be coupled to the output of the trigger 320 and in series with the second tuning capacitor 326. The second tuning capacitor 326 may be coupled to ground and a voltage at a node between the second tuning resistor 324 and the second tuning capacitor 326 may control the switch 322 (e.g., the voltage at the node may be the gate voltage of the switch 322).

In an embodiment, a charge derived from the generated DC is stored in the charging capacitor 316. When the charge stored in the charging capacitor 316 exceeds a threshold value, the trigger 320 is configured to generate the trigger signal 330. As an example, the trigger 320 is a Schmitt trigger and the threshold value is set by the Schmitt trigger. The trigger signal 330 may be a pulse waveform. A width of the pulse may be adjusted by adjusting a resistance of the second tuning resistor 324 and a capacitance of the second tuning capacitor 326. Likewise, a frequency of the pulse may be adjusted by adjusting a resistance of the first tuning resistor 314 and a capacitance of the charging capacitor 316.

In an embodiment, when the pulse is generated (e.g., the trigger signal 330 is in a high state (logical one)), the switch 322 may be enabled, which discharges the charging capacitor 316. Once the trigger signal 330 transitions back to a low state (e.g., logical zero), the switch 322 may be disabled, which allows the charging capacitor 316 to once again store charge. The process described herein may then be repeated to generate another pulse.

The trigger signal 330 generated by the trigger 320 may control a switch (e.g., the switch 606 as described below with respect to FIG. 7A or the switch 656 as described below with respect to FIG. 7B) coupled to a power source, such as the power source 230. For example, the trigger signal 330 may allow the power source 230 to supply power to the transceiver 214 such that the STA 106 can transmit and receive messages. The function of the trigger signal 330 is described in greater detail below with respect to FIGS. 7A-B.

Figure 4:
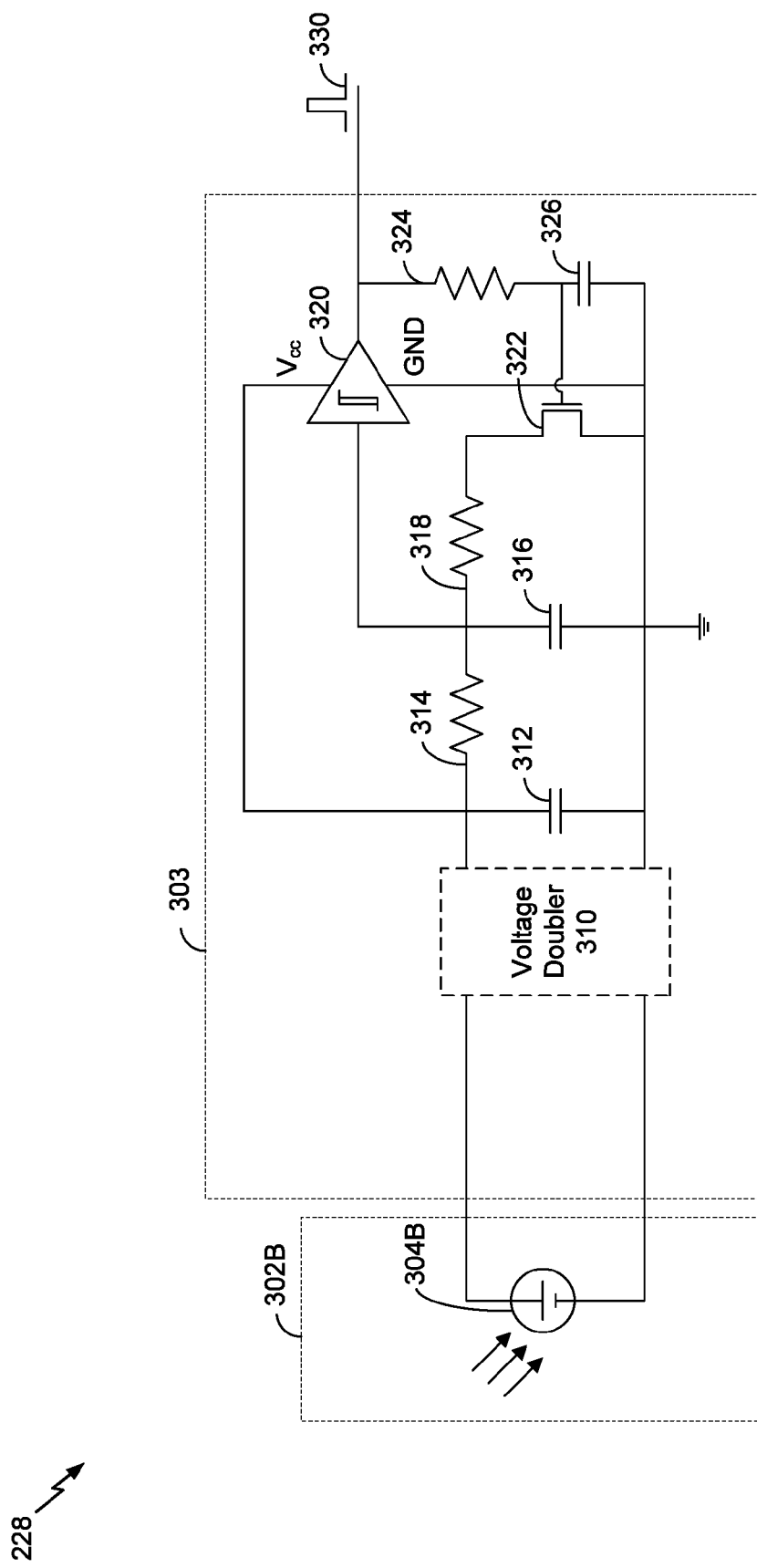
FIG. 4 is another block diagram of the pulse generating device of FIG. 2.

FIG. 4 is another block diagram of the pulse generating device 228 of FIG. 2. As illustrated in FIG. 4, the pulse generating device 228 may include an energy generation block 302B and the pulse generator 303. In an embodiment, the energy generation block 302B includes one or more photovoltaic cells 304B. The one or more photovoltaic cells 304B may be configured to generate DC when exposed to ambient light (e.g., sunlight, artificial light, etc.). The DC may be passed to the voltage doubler 310 and/or to the other components of the pulse generator 303. If passed to the voltage doubler 310, the voltage doubler 310 may be configured to increase the voltage produced by the one or more photovoltaic cells 304B such that the voltage is at a level sufficient to eventually generate the trigger signal 330. The one or more photovoltaic cells 304B may be located on an exterior portion of the STA 106 so that the one or more photovoltaic cells 304B are exposed to ambient light when the ambient light is present. Alternatively, the one or more photovoltaic cells 304B may be located inside the STA 106 and covered by a transparent or semi-transparent material that allows ambient light to pass through to the one or more photovoltaic cells 304B.

The output of the voltage doubler 310 (e.g., if the voltage doubler 310 is present) or the output of the one or more photovoltaic cells 304B (e.g., if the voltage doubler 310 is not present) may be coupled in series with the rest of the components of the pulse generator 303, as described above with respect to FIG. 3.

Figure 5:
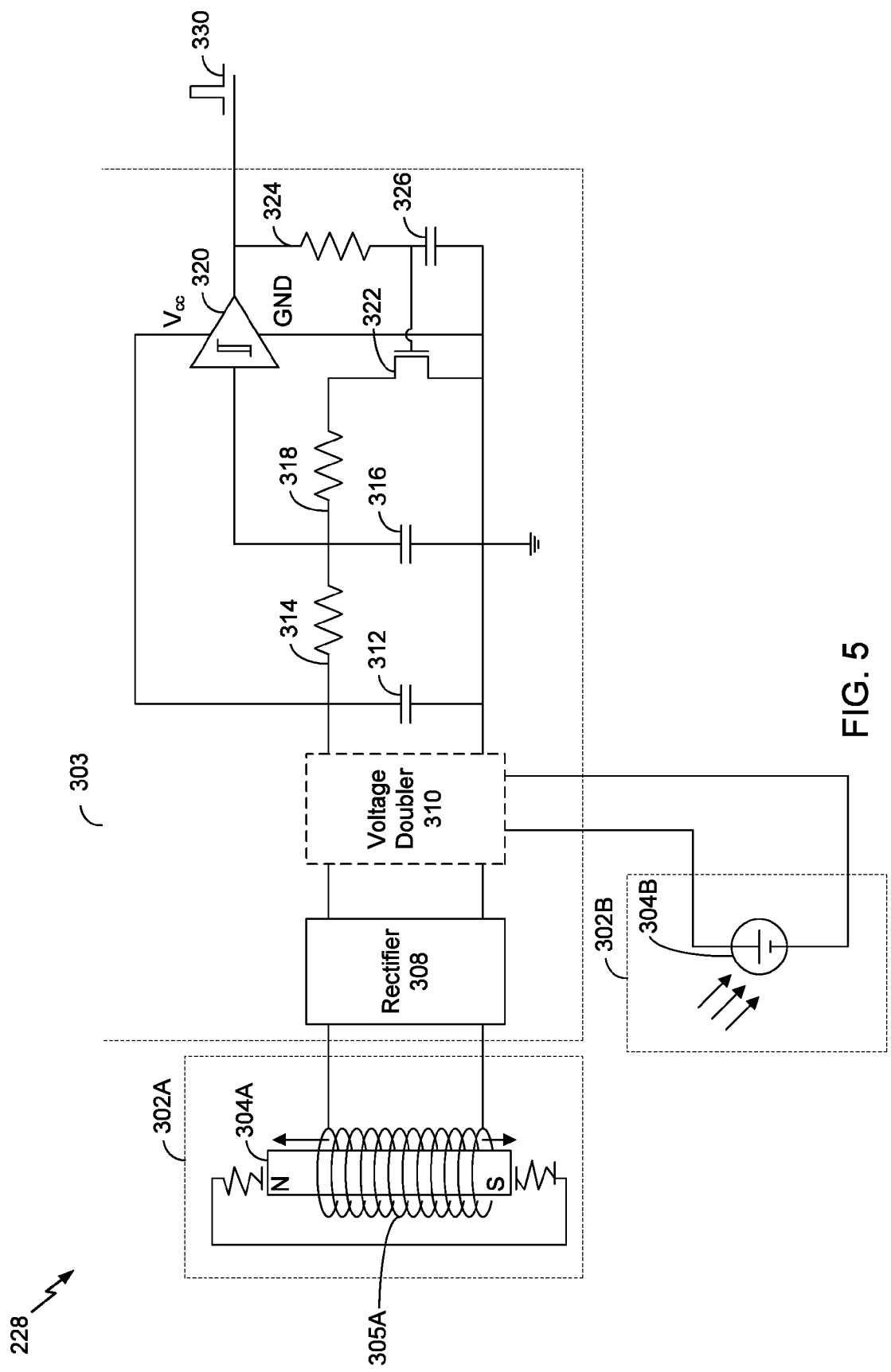
FIG. 5 is another block diagram of the pulse generating device of FIG. 2.

FIG. 5 is another block diagram of the pulse generating device 228 of FIG. 2. As illustrated in FIG. 5, the pulse generating device 228 may include the energy generation block 302A, the energy generation block 302B, and the pulse generator 303. The DC produced by the rectifier 308 and the DC produced by the one or more photovoltaic cells 304B may be combined before being sent to the other components of the pulse generator 303. Alternatively, the coil 305A and magnet 304A or the one or more photovoltaic cells 304B may be selected to produce energy (e.g., via a switch accessible by a user, based on an amount of current generated by the coil 305A and magnet 304A and/or the one or more photovoltaic cells 304B, or the like). The pulse generator 303 may function as described above with respect to FIG. 3.

Figure 6:
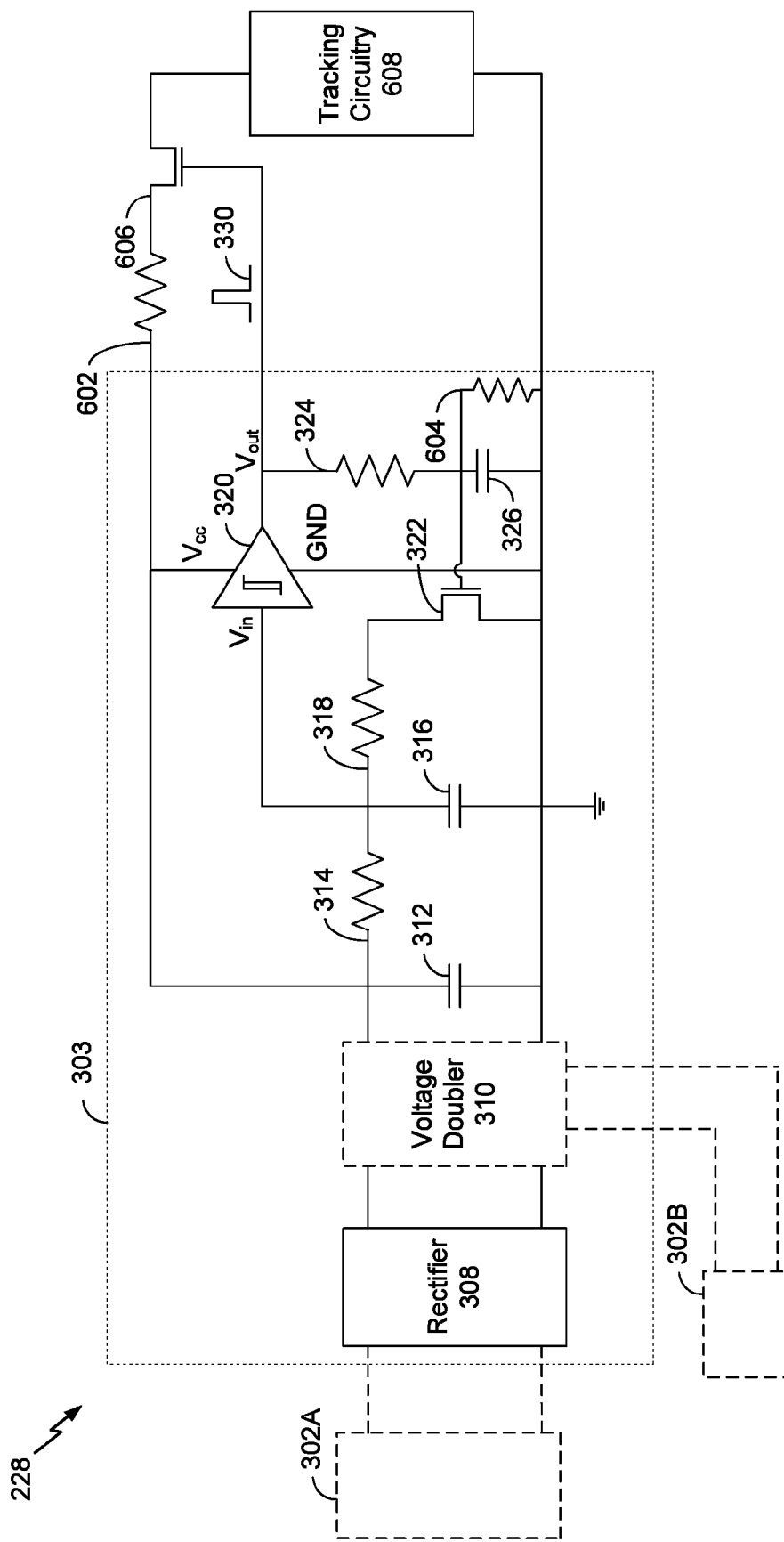
FIG. 6 is a more detailed block diagram of the pulse generating device of FIG. 2.

FIG. 6 is a more detailed block diagram of the pulse generating device 228 of FIG. 2. As illustrated in FIG. 6, the pulse generating device 228 may include the energy generation block 302A, the energy generation block 302B, and/or the pulse generator 303. The pulse generator 303 may function as described above with respect to FIG. 3. In addition to the components described above with respect to the pulse generator 303, the pulse generator 303 may include a discharge resistor 604. The discharge resistor 604 may ensure that the second tuning capacitor 326 is properly discharged when the trigger 320 outputs the trigger signal 330.

The pulse generator 303 may be coupled to a switch resistor 602 and a switch 606. The switch resistor 602 and switch 606 may be coupled to a tracking circuitry 608. In an embodiment, the tracking circuitry 608 is configured to determine tracking and/or monitoring information of the wireless device 202. Such information may be provided to other devices, such as the AP 104, via the transceiver 214. As described in greater detail below, the switch resistor 602 and/or the switch 606 may control whether tracking circuitry 608 (and/or other circuitry in the wireless device 202) receives power.

In some embodiments, one or more equations are used to determine the width and/or amplitude of the trigger signal 330. For example, the general equation for charging a capacitor via a resistor is as follows:

$$V_C(t) = V_{in} \cdot (1 - e^{-\frac{t}{\tau}}) \tag{1}$$

with the time constant $\tau = R \cdot C$.

The output of the trigger 320 (e.g., $V_{out}$, trigger signal 330) may switch from low (e.g., "0") to high (e.g., "1") when the input voltage of the trigger 320 (e.g., $V_{in}$) reaches $V_{com01}$. The time it takes to charge the charging capacitor 316 from 0V to $V_{com01}$ is given as follows:

$$V_{com01} = V_{in} \cdot \left(1 - e^{-\frac{t_{01}}{R_{314} \cdot C_{316}}}\right) \tag{2}$$

where $t_{01}$ is the time it takes for a "0" to "1" transition when charging the charging capacitor 316 from 0V to $V_{com01}$. The equation can be solved for $t_{01}$ and becomes the following:

$$t_{01} = -(R_{314} C_{316}) \cdot \ln\left(1 - \frac{V_{com01}}{V_{in}}\right) \tag{3}$$

Once the trigger signal 330 goes high, the second tuning resistor 324 and the second tuning capacitor 326 begin charging up the second tuning capacitor 326. The time it takes for the second tuning capacitor 326 to go from 0V to $V_{GS1}$ (e.g., when switch 322 turns on) is given as follows:

$$t_{10a} = -(R_{324} C_{326}) \cdot \ln\left(1 - \frac{V_{GS1}}{V_{out}}\right) \tag{4}$$

where $V_{GS1}$ may represent the gate voltage that activates the switch 322. If it is assumed that there is no voltage drop from $V_{cc}$ (e.g., the supply voltage of the trigger 320) to $V_{out}$, then Equation (4) can be rewritten as follows:

$$t_{10a} = -(R_{324} C_{326}) \cdot \ln\left(1 - \frac{V_{GS1}}{V_{cc}}\right) \tag{5}$$

When the voltage of the second tuning capacitor 326 has reached $V_{GS1}$, then the switch 322 may start conducting, and thus discharge the charging capacitor 316. The time that it takes for the voltage across the charging capacitor 316 to decrease to a level that may allow the trigger 320 output to switch from "1" to "0" is as follows:

$$t_{10b} = -(R_{318}C_{316}) \cdot \ln\left(\frac{V_{com10}}{V_{com01} + V_{extra}}\right) \quad (6)$$

where $V_{com10}$ may be the voltage at the input fo the trigger 320 that transitions the trigger signal 330 from "1" to "0" and where $V_{extra}$ is the additional voltage that the charging capacitor 316 has been charged during the time that it took to charge the second tuning capacitor 326 (e.g., $t_{10a}$). Equation (6) may be rewritten as follows:

$$t_{10b} = -(R_{318}C_{316}) \cdot \ln\left(\frac{V_{com10}}{V_{in} \cdot \left(1 - e^{\frac{-(t01+t10a)}{R_{314} \cdot C_{316}}}\right)}\right) \quad (7)$$

The time that the wireless device 202 is powered on or activated (e.g., a time defined by the width of the trigger signal 330 pulse) may be as follows:

$$t_{pulse} = t_{10a} + t_{10b} \quad (8)$$

where $t_{10a}$ and $t_{10b}$ may be provided by Equations (5) and (8), respectively. The pulse width may be rewritten based on Equations (5) and (8), and may be as follows:

$$t_{pulse} = \\
-(R_{324}C_{326}) \cdot \ln\left(1 - \frac{V_{GS1}}{V_{cc}}\right) - (R_{318}C_{316}) \cdot \ln\left(\frac{V_{com10}}{V_{in} \cdot \left(1 - e^{\frac{-(A+B)}{R_{314}C_{316}}}\right)}\right) \quad (9)$$

where A is given by Equation (3) and B is given by Equation (5).

Figure 7A:
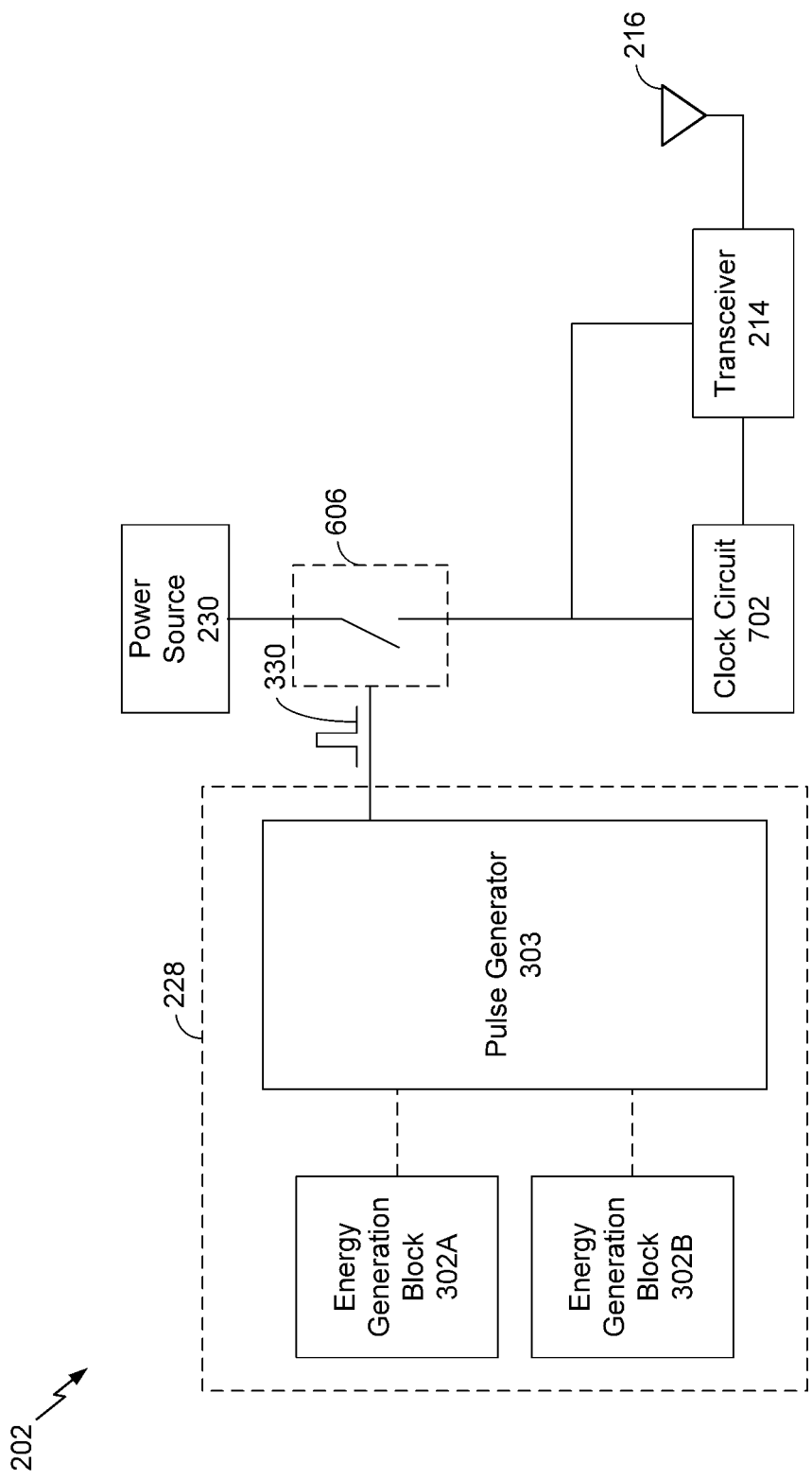
FIG. 7A is a block diagram of the pulse generating device of FIGS. 3-6 as used in the wireless device of FIG. 2.

FIG. 7A is a block diagram of the pulse generating device 228 of FIGS. 3-6 as used in the wireless device 202 of FIG. 2. As illustrated in FIG. 7A, the wireless device 202 may include the transceiver 214, the antenna 216, the pulse generating device 228, a clock circuit 702, the power source 230 (e.g., a battery), and/or the switch 606. In an embodiment, the energy generation block 302A and/or the energy generation block 302B may be coupled to the pulse generator 303.

The clock circuit 702 may be configured to generate a clock signal. The transceiver 214 may receive and/or transmit messages when the clock signal is generated (e.g., the transceiver 214 may use the clock signal to receive and/or transmit messages). In addition, other components of the wireless device 202 (e.g., the processor 204) may use the clock signal.

In an embodiment, the switch 606 may couple the power source 230 to the clock circuit 702, the transceiver 214, and/or other components of the wireless device 202, not shown (e.g., sensors, processors, etc.). The wireless device 202 is considered to be in a wake-up state (e.g., an active state) when the switch 606 is closed and is considered to be in a sleep state when the switch 606 is open. For example, when the trigger signal 330 is high (e.g., a pulse has been generated), the switch 606 may be closed and power may be supplied to the components of the wireless device 202. Thus, in the active state, the clock circuit 702 may be active (e.g., powered on) and configured to generate the clock signal. When the trigger signal 330 is low (e.g., no pulse has been generated), the switch 606 may be open and no power may be supplied to the components of the wireless device 202. Thus, in the sleep state, the clock circuit 702 may be inactive (e.g., powered off) and not configured to generate the clock signal.

In some embodiments, the transceiver 214 is configured to transmit data via a wired or wireless connection to the AP 104. Thus, the wireless device 202 (e.g., the STA 106) is configured to transmit data to the AP 104 when the trigger signal 330 is high (e.g., when in the active state). In situations in which the pulse generating device 228 includes the energy generation block 302A, the STA 106 is configured to transmit data while or after the STA 106 is in motion. As an example, when the STA 106 is used to track a pet, it may be desirable to communicate with the AP 104 when the pet (and thus the STA 106) is in motion. When the pet is stationary, an owner may not be worried about the pet escaping or otherwise leaving a bounded area. However, when the pet is active, the owner may want to know a location of the pet and/or whether the pet has escaped or otherwise left a bounded area. Instead of consuming power to communicate with the AP 104 in set intervals of time, the STA 106 may conserve power by only communicating with the AP 104 when there is new information available (e.g., a position or location has changed or the need to raise an alert arises).

As described above, the STA 106 may be a geo-location device. The geo-location device may communicate with a GPS (e.g., AP 104), for example, to establish a location of the STA 106. However, a GPS requires devices to include a clock so the devices can properly determine their location based on messages received from the GPS. For example, the GPS may transmit a message to a geo-location device that includes a time that the message was sent and a position of a satellite that transmitted the message. A geo-location device can calculate its current location by, in part, calculating a transmit time of the message. Without a clock, the geo-location device may not be able to calculate the transmit time. In addition, the devices may need the clock to know when to wake-up to receive messages from the GPS. Accordingly, the STA 106 as described herein may receive a message (e.g., via the transceiver 214) that includes the current time (e.g., wall clock time) from the AP 104 when it does not include a clock that receives continuous power (e.g., as illustrated in FIG. 7A). The current time received from the AP 104 may then be used to calculate the transmit time and ultimately the geo-location of the STA 106 and/or to calculate a time when the STA 106 should expect to receive messages from the AP 104.

Figure 7B:
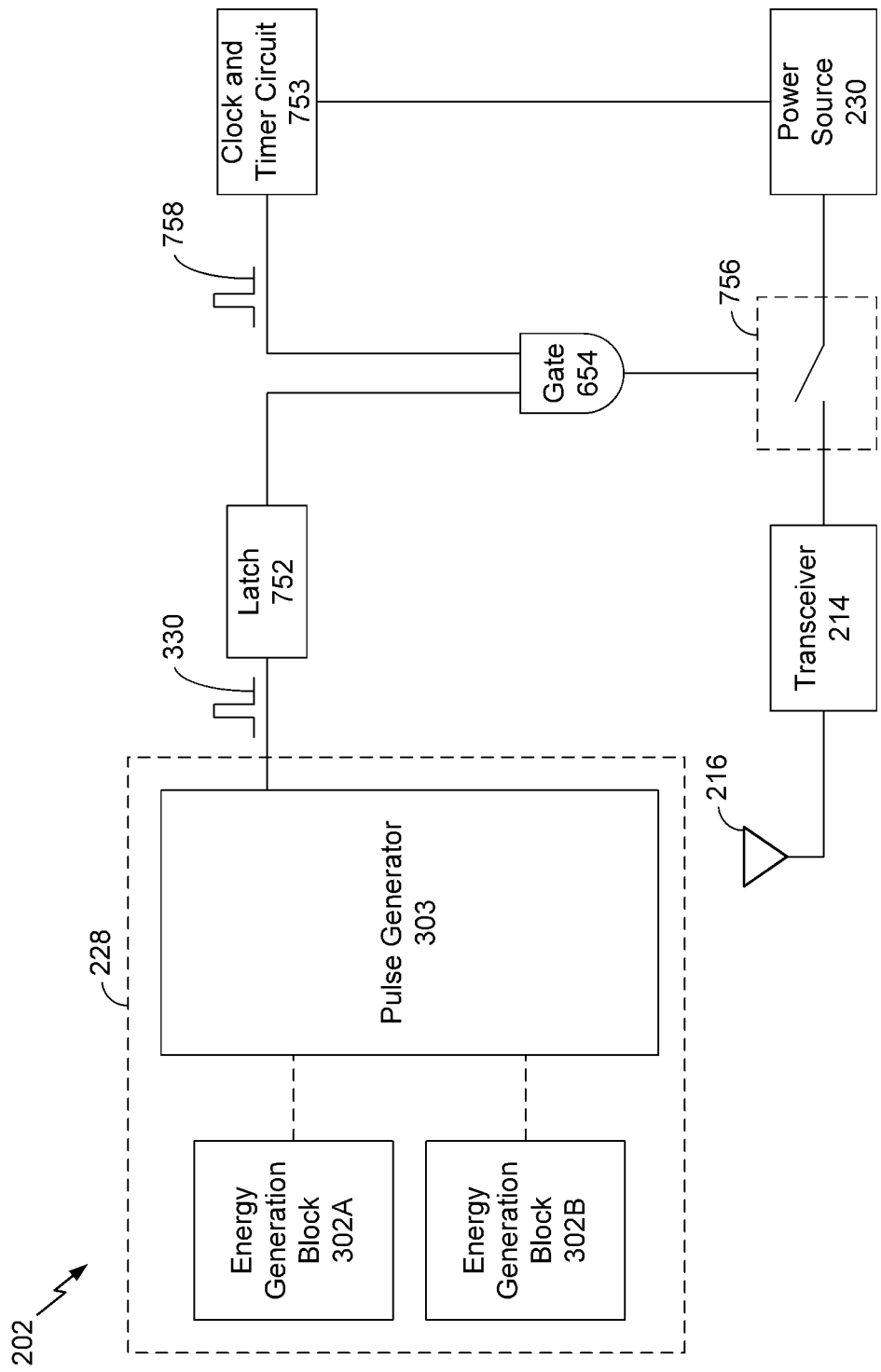
FIG. 7B is another block diagram of the pulse generating device of FIGS. 3-6 as used in the wireless device of FIG. 2.

FIG. 7B is another block diagram of the pulse generating device 228 of FIGS. 3-6 as used in the wireless device 202 of FIG. 2. As illustrated in FIG. 7B, the wireless device 202 may include the transceiver 214, the antenna 216, the pulse generating device 228, the power source 230, a latch 752, a clock and timer circuit 753, a gate 754 (e.g., an AND gate, a NAND gate, etc.), and/or a switch 756. In an embodiment, the energy generation block 302A and/or the energy generation block 302B may be coupled to the pulse generator 303.

In an embodiment, the switch 756 couples the power source 230 to the transceiver 214. The switch 756 may be controlled by the output of the gate 754. During the active state, the switch 756 is closed (e.g., power is provided to the transceiver 214). Likewise, during the sleep state, the switch 756 is open (e.g., no power is provided to the transceiver 214).

In an embodiment, the clock and timer circuit 753 draws power from the power source 230, regardless of whether the wireless device 202 is in the active state or the sleep state. However, the clock and timer circuit 753 may receive less power during the sleep state than during the active state. For example, the clock and timer circuit 753 may receive enough power to operate at a lowest sustainable frequency (e.g., 32

KHz) during the sleep state. The clock and timer circuit 753 may receive enough power to run at full operation during the active state.

The clock and timer circuit 753 may generate a clock signal and a timer expiry signal 758 used to determine when the wireless device 202 transitions into the active state. For example, the clock signal may include periodic pulses and a counter (not shown) may be used to count the number of pulses that have been generated. After a set number of pulses have been generated (e.g., after a set period of time has passed), the clock and timer circuit may generate the timer expiry signal 758.

The trigger signal 330 and the timer expiry signal 758 may be inputs to the gate 754. In an embodiment, when the trigger signal 330 is high and the timer expiry signal 758 is high (e.g., logical one, indicating that the set period of time has passed), the switch 756 is closed. Thus, the wireless device 202 may be in the active state and configured to communicate with the AP 104 when the wireless device 202 is in motion or exposed to ambient light and after a set period of time has passed.

In other embodiments, not shown, the wireless device 202 may be configured to respond to requests made by the AP 104 only under certain conditions. For example, the AP 104 may request information from the wireless device 202 via the transmission of a signal (e.g., a waveform, a pulse of energy of known parameters, etc.) to the wireless device 202. Such information may include a location or position of the wireless device 202, measurements obtained from one or more sensors of the wireless device 202, and/or other information determined by the wireless device 202. The wireless device 202 may detect the presence of this signal (e.g., via the receiver 212, the signal detector 218, etc.) and supply the signal to a logical element, such as an AND gate. In addition, the wireless device 202 may accumulate energy via the pulse generating device 228 as described herein. When the accumulated energy exceeds a predetermined amount, a circuit, such as the trigger 320 may generate an electrical pulse signal that is latched and also provided to the logical element.

In an embodiment, if the signal and the electrical pulse signal are received by the logical element at the same or at nearly the same time, the logical element may generate a high signal (e.g., a logical AND may be true). The high signal may cause the wireless device 202 to power on the other components of the wireless device 202 (e.g., the processor 204, the transceiver 214, clock circuit 702, sensors (not shown), and/or the like). Thus, the wireless device 202 may then capture and/or determine the information requested by the AP 104 and transmit such information to the AP 104.

In an embodiment, if the signal and the electrical pulse signal are not received by the logical element at the same or at nearly the same time, the logical element may generate a low signal (e.g., a logical AND may be false). The low signal may cause the wireless device 202 to prevent the other components of the wireless device 202 from receiving power. In such a situation, the AP 104 may not receive any message from the wireless device 202 and thus may conclude that there was no new information to be obtained. It may be noted that with conventional technologies, there may be no additional energy spent to detect the presence of a signal. In this way, the number of messages and the overall duration of time used for communicating information to the AP 104 may be reduced, thereby conserving power.

In other embodiments, not shown, the wireless device 202 may be configured to initiate a communication with the AP 104 when the wireless device 202 determines that there may be new information to provide to the AP 104. For example, the wireless device 202 may be configured to accumulate energy via the pulse generating device 228 as described herein. When the accumulated energy exceeds a predetermined amount, the wireless device 202 may transmit (e.g., via the transmitter 210) a signal (e.g., a waveform, a pulse of energy, etc.) to the AP 104. The AP 104 may, upon detecting the signal, activate or supply power to one or more receivers of the AP 104 such that the one or more receivers can receive subsequent messages from the wireless device 202. It may be noted that with conventional technologies, there may be no additional energy spent to detect the presence of the signal. In this way, the number of messages and the overall duration of time used for communicating information to the AP 104 may be reduced, thereby conserving power.

Figure 8:
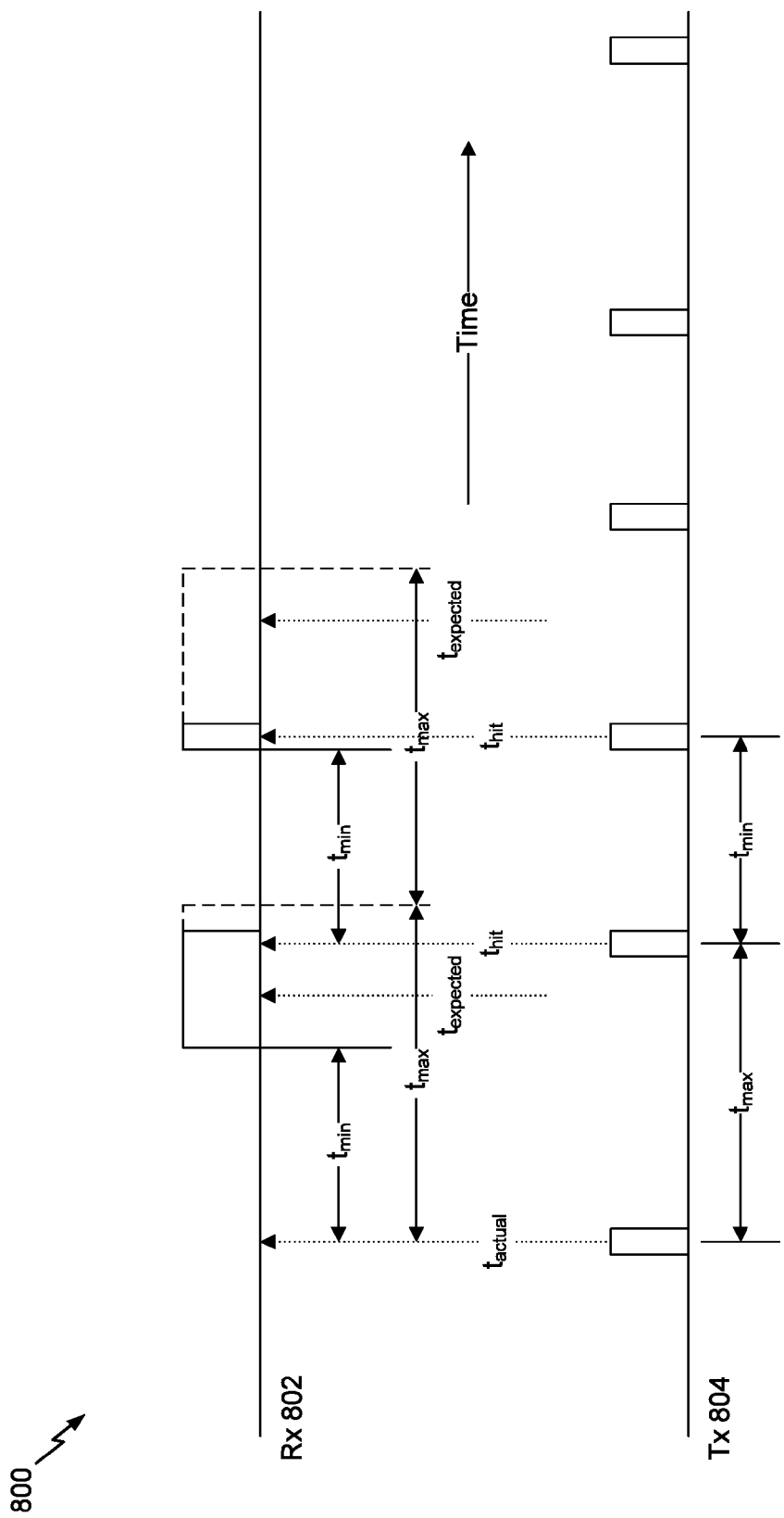
FIG. 8 is a timing diagram of a communication between a station and an access point within the wireless communication system of FIG. 1.

FIG. 8 is a timing diagram 800 of a communication between the STA 106 and the AP 104 within the wireless communication system of FIG. 1. A receive timing diagram 802 illustrates the duration of time (e.g., scan windows) that the AP 104 listens for messages transmitted by the STA 106. A transmit timing diagram 804 illustrates when messages are transmitted by the STA 106.

Since the STA 106 may be configured to transmit messages to the AP 104 when at least the trigger signal 330 is high, the messages may not be transmitted in perfectly periodic intervals (e.g., because the STA 106 may not always be in motion and/or because the STA 106 may not always be exposed to ambient light). In an embodiment, the AP 104 may employ adaptive scanning techniques to conserve power by only listening for messages from the STA 106 during certain periods of time. For example, the AP 104 may heuristically determine an expected time of arrival of a message from the STA 106 based on previously transmitted messages. The AP 104 may wait a period of time defined by $t_{min}$ and then scan for messages for a period of time defined by $t_{max}-t_{min}$. After the scanning window has ended (e.g., after a period of time defined by $t_{max}$), the AP 104 may wait a period of time defined by $t_{min}$ before scanning for messages again. As illustrated in FIG. 8, the AP 104 may expect to receive a message from the STA 106 at a time $t_{expected}$, which falls sometime within the scanning window.

In an embodiment, if a message is received by the AP 104 before the scanning window has ended, the scanning window is prematurely terminated at a time immediately after or soon after the message is received (e.g., as illustrated by the receive timing diagram 802 after a time $t_{hit}$). The AP 104 may then wait a period of time defined by $t_{min}$ after the scanning window is prematurely terminated before scanning for messages again.

In an embodiment, the time $t_{min}$ is calculated based on the shortest interval of time between two successive messages from the STA 106. The time $t_{max}$ may be calculated based on the longest interval of time between two successive messages from the STA 106. As the AP 104 continues to receive messages from the STA 106, the $t_{min}$ and $t_{max}$ values may be adjusted accordingly by the AP 104. For example, a new $t_{min}$ value may be generated if two successive messages are received from the STA 106 within a time that is less than the previously generated $t_{min}$ value. As another example, a new $t_{max}$ value may be generated if two successive messages are received from the STA 106 within a time that is more than the previously generated $t_{max}$ value. Thus, as the $t_{min}$ and $t_{max}$ values are adjusted, the duration of the scanning windows is also adjusted.

The AP 104 and the STA 106 may engage in acknowledgement and retransmission procedures to ensure that the AP 104 does not miss a message. For example, the STA 106 may retransmit a message if the STA 106 does not receive an acknowledgement from the AP 104 within a set period of time. In this way, the AP 104 may be adapted to scan for messages from the STA 106 for a period of time that covers the nearest and farthest expected time of arrival.

Figure 9:
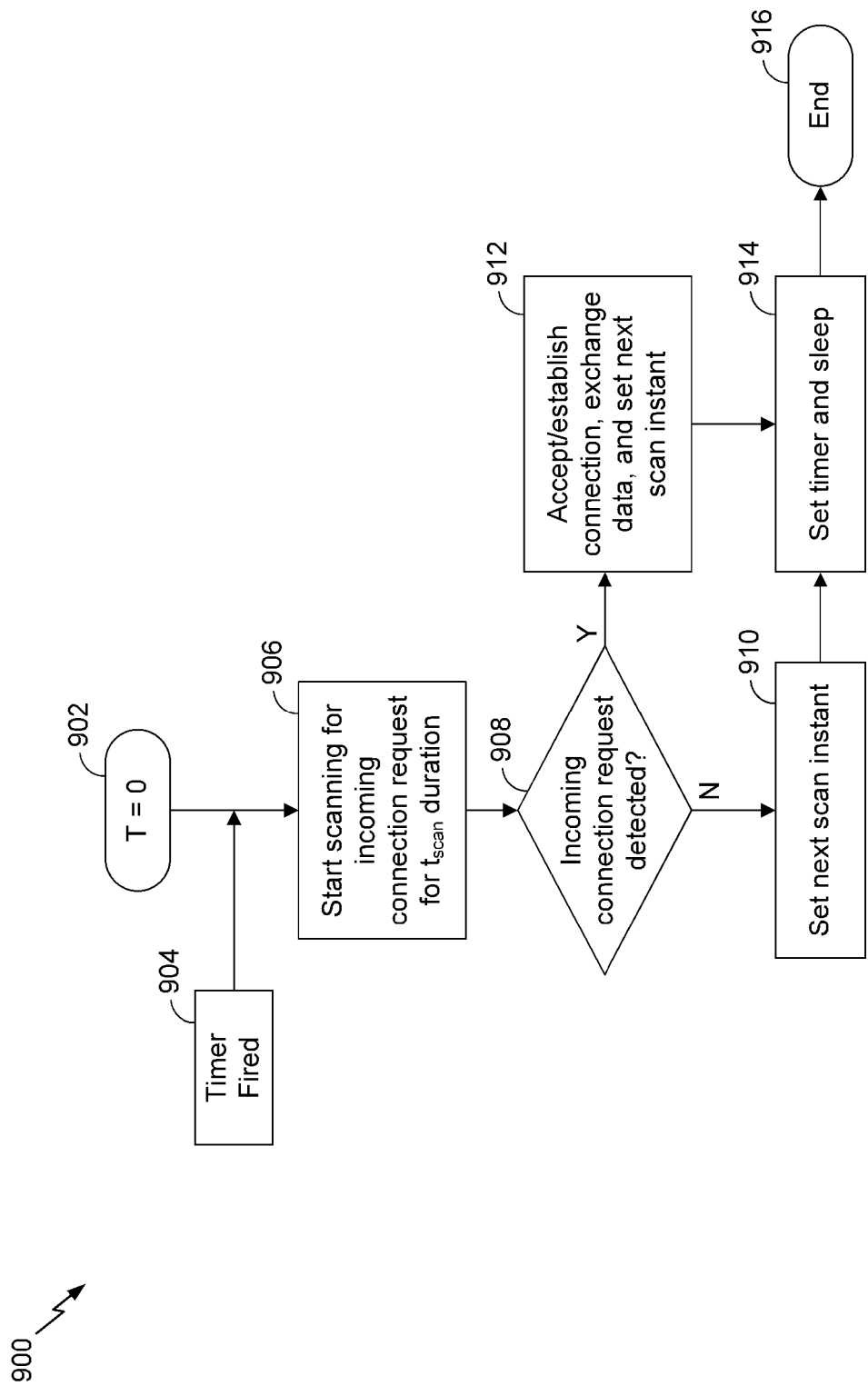
FIG. 9 is a decision diagram for an access point to heuristically determine an expected time of arrival of a message from a station.

FIG. 9 is a decision diagram 900 for the AP 104 to heuristically determine an expected time of arrival of a message from the STA 106. The functionality described herein with respect to the decision diagram 900 may be executed by components of the AP 104, such as the processor 204. The decision diagram 900 begins at block 902. At block 902, a timer is set to zero and the AP is in the sleep state.

At block 904, the timer is fired, indicating that the AP 104 is to transition from the sleep state to the active state. At block 906, the AP 104 scans for an incoming connection request (e.g., a page, a message, etc.) from the STA 106 for the duration defined by $t_{scan}$. The time defined by $t_{scan}$ may be a maximum amount of time that the AP 104 will listen for incoming connection requests. In an embodiment, $t_{scan}$ corresponds to the period of time defined by $t_{max}-t_{min}$ as described above with respect to FIG. 8. In an embodiment, $t_{scan}$ may initially be set to infinity (e.g., the AP 104 may continue listening for messages until it receives a message from the STA 106). After receiving the first incoming connection request, $t_{scan}$ may be defined as described above. At block 908, the AP 104 determines whether the incoming connection request was detected. If the incoming connection request was not detected, the AP 104 executes the functions described with respect to block 910. If the incoming connection request was detected, the AP 104 executes the functions described with respect to block 912.

At block 910, the AP 104 calculates and sets the next scan instant. For example, the next scan instant may be the time defined by the current time (e.g., the time at the instant that the AP 104 stops scanning for the $t_{scan}$ duration of time) plus a first time offset. The first time offset may be the minimum of a time defined by $t_{MinScanInterval}$ and a time defined by $t_{page\_threshold}$. A time defined by $t_{scaninterval}$ may be the amount of time between two successive scans during which the AP 104 may enter a sleep state or sleep mode. Thus, the time defined by $t_{MinScanInterval}$ may be the shortest time that the AP 104 can skip scanning (e.g., be in the sleep state) without missing an incoming connection request. In an embodiment, $t_{MinScanInterval}$ corresponds to the shortest time it takes to charge the charging capacitor 316 as described above with respect to FIG. 3. In addition, $t_{MinScanInterval}$ may correspond to $t_{min}$ of FIG. 8.

A time defined by $t_{page}$ may be a maximum amount of time that the STA 106 may communicate with the AP 104 in order to establish a connection with the AP 104. A threshold may be a margin overhead percentage. Thus, the time defined by $t_{page\_threshold}$ may be a margin overhead percentage that is added to the time defined by $t_{page}$. In an embodiment, the margin overhead percentage is added to the time defined by $t_{page}$ to ensure that the AP 104 does not miss an incoming connection request.

At block 912, the AP 104 accepts and/or establishes a connection with the STA 106. In addition, the AP 104 may exchange wall clock time with the STA 106 and/or receive location data, position data, and/or other information from the STA 106. In an embodiment, the AP 104 calculates and sets the next scan instant. For example, the next scan instant may be the time defined by the current time (e.g., the time at the instant that the incoming connection request, subsequent connection request, or other message is received by the AP 104) plus a second time offset. The second time offset may be the time defined by $t_{MinScanInterval}$. In this way, the second time offset may depend on the rate by which the STA 106 accumulates energy from the environment. Optionally, the AP 104 may adjust or estimate the next $t_{MinScanInterval}$, such as described above with respect to FIG. 8.

At block 914, the AP 104 sets the time and enters the sleep state. At block 916, the decision diagram 900 ends. Optionally, the AP 104 may wake up (e.g., power on) at the set time and repeat blocks 902 through 914 for subsequent incoming connection requests and/or other messages from the STA 106.

Figure 10:
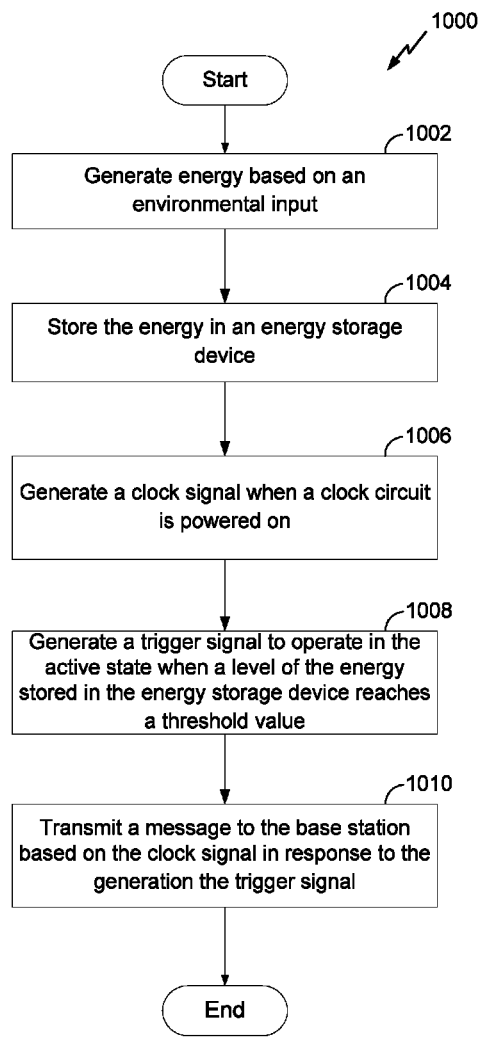
FIG. 10 is a flowchart of an exemplary method for communicating with a base station.

FIG. 10 is a flowchart of an exemplary method 1000 for communicating with a base station. In an embodiment, the steps in flowchart 1000 may be performed by the STA 106 (e.g., the wireless device 202). Although the method of flowchart 1000 is described herein with reference to a particular order, in various embodiments, blocks herein may be performed in a different order, or omitted, and additional blocks may be added. A person having ordinary skill in the art will appreciate that the method of flowchart 1000 may be implemented in any device that may be configured to communicate with another device.

At block 1002, energy based on an environmental input is generated. In an embodiment, the energy may be generated based on motion of a magnet within a coil or based on exposure to ambient light. At block 1004, the energy is stored in an energy storage device. In an embodiment, an electrical pulse is generated when the energy stored in the energy storage device exceeds a predetermined threshold.

At block 1006, a clock signal is generated when a clock circuit is powered on. In an embodiment, the clock circuit is powered on during an active state of the STA 106 and is powered off during a sleep state of the STA 106. In an embodiment, the clock circuit is powered on when the electrical pulse is generated. At block 1008, a trigger signal is generated to operate in the active state when a level of the energy stored in the energy storage device reaches a threshold value. At block 1010, a message to the base station is transmitted based on the clock signal in response to the generation of the trigger signal. In an embodiment, the trigger signal is an electrical pulse.

Figure 11:
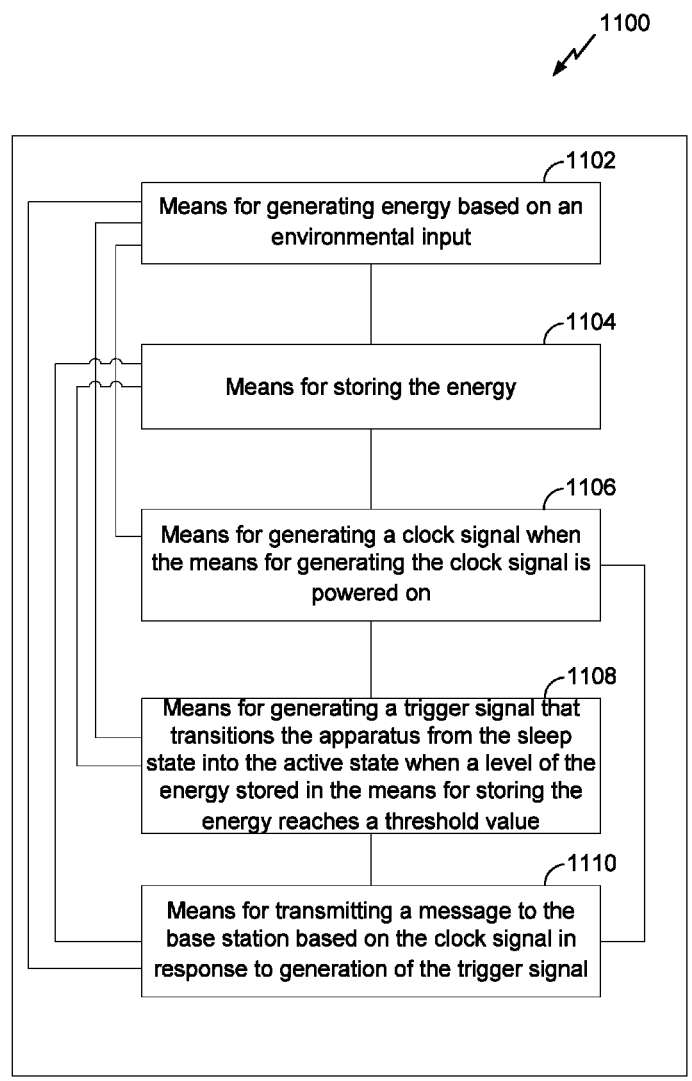
FIG. 11 is a functional block diagram of a station, in accordance with an exemplary embodiment.

FIG. 11 is a functional block diagram of a STA 1100, in accordance with an exemplary embodiment. STA 1100 comprises means 1102, means 1104, means 1106, means 1108, and means 1110 for the various actions discussed with respect to FIGS. 1-7B. The STA 1100 includes means 1102 for generating energy based on an environmental input. In an embodiment, means 1102 for generating energy based on an environmental input may be configured to perform one or more of the functions discussed above with respect to block 1002. The STA 1100 further includes means 1104 for storing the energy. In an embodiment, means 1104 for storing the energy may be configured to perform one or more of the functions discussed above with respect to block 1004. The STA 1100 includes means 1106 for generating a clock signal when the means for generating the clock signal is powered on. In an embodiment, means 1106 for generating a clock signal when the means for generating the clock signal is powered on may be configured to perform one or more of the functions discussed above with respect to block 1006.

The STA 1100 further includes means 1108 for generating a trigger signal that transitions the apparatus from the sleep state into the active state when a level of the energy stored in the means for storing the energy reaches a threshold value. In an embodiment, means 1108 for generating a trigger signal that transitions the apparatus from the sleep state into the active state when a level of the energy stored in the means for storing the energy reaches a threshold value may be configured to perform one or more of the functions discussed above with respect to block 1008. The STA 1100 further includes means 1110 for transmitting a message to the base station based on the clock signal in response to the generation of the trigger signal. In an embodiment, means 1110 for transmitting a message to the base station based on the clock signal in response to the generation of the trigger signal may be configured to perform one or more of the functions discussed above with respect to block 1010.

Figure 12:
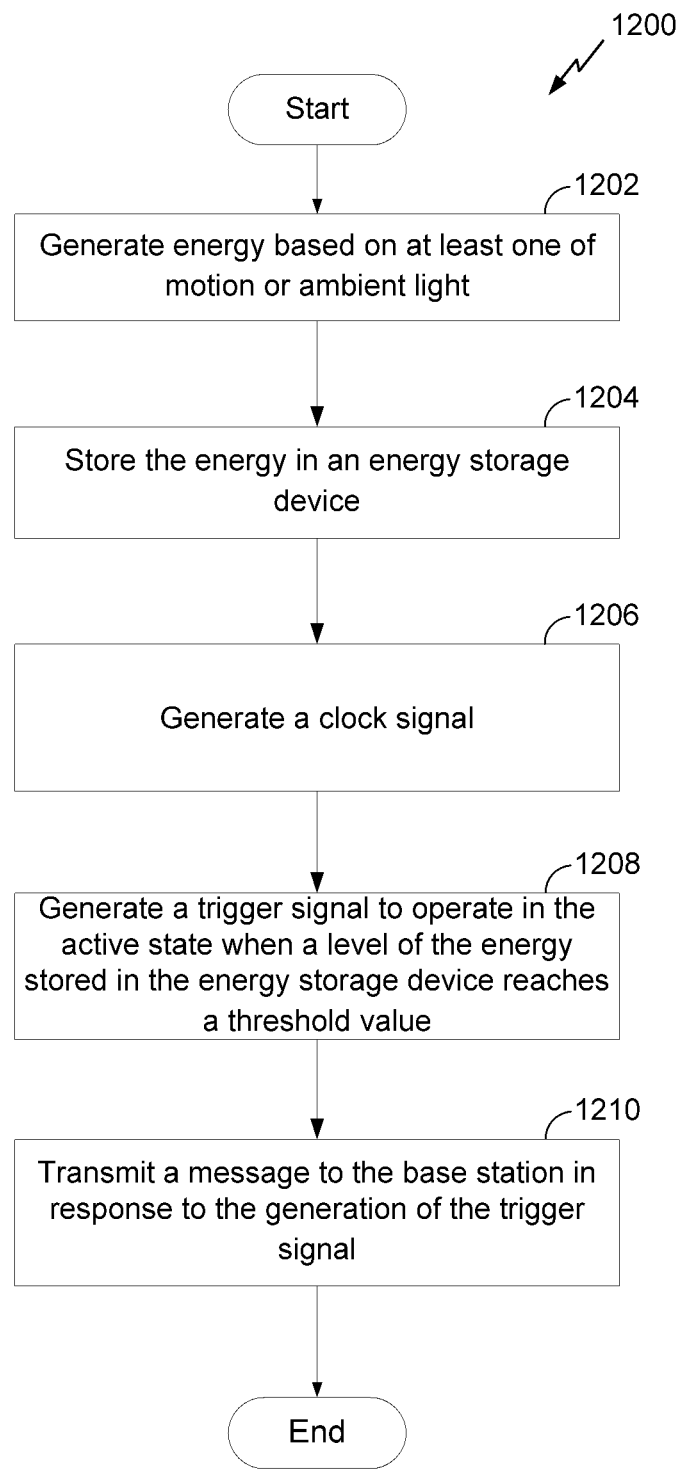
FIG. 12 is a flowchart of another exemplary method for communicating with a base station.

FIG. 12 is a flowchart of another exemplary method 1200 for communicating with a base station. In an embodiment, the steps in flowchart 1200 may be performed by the STA 106 (e.g., the wireless device 202). Although the method of flowchart 1200 is described herein with reference to a particular order, in various embodiments, blocks herein may be performed in a different order, or omitted, and additional blocks may be added. A person having ordinary skill in the art will appreciate that the method of flowchart 1200 may be implemented in any device that may be configured to communicate with another device.

At block 1202, energy based on at least one of motion or ambient light is generated. In an embodiment, the energy may be generated based on motion of a magnet within a coil or based on exposure to the ambient light. At block 1204, the energy is stored in an energy storage device.

At block 1206, a clock signal is generated. In an embodiment, the clock signal is generated by a clock circuit, which operates in a low power state during a sleep state of the STA 106 and in an active state during an active state of the STA 106. At block 1208, a trigger signal is generated to operate in the active state when a level of the energy stored in the energy storage device reaches a threshold value. At block 1210, a message to the base station is transmitted in response to the generation of the trigger signal.

Figure 13:
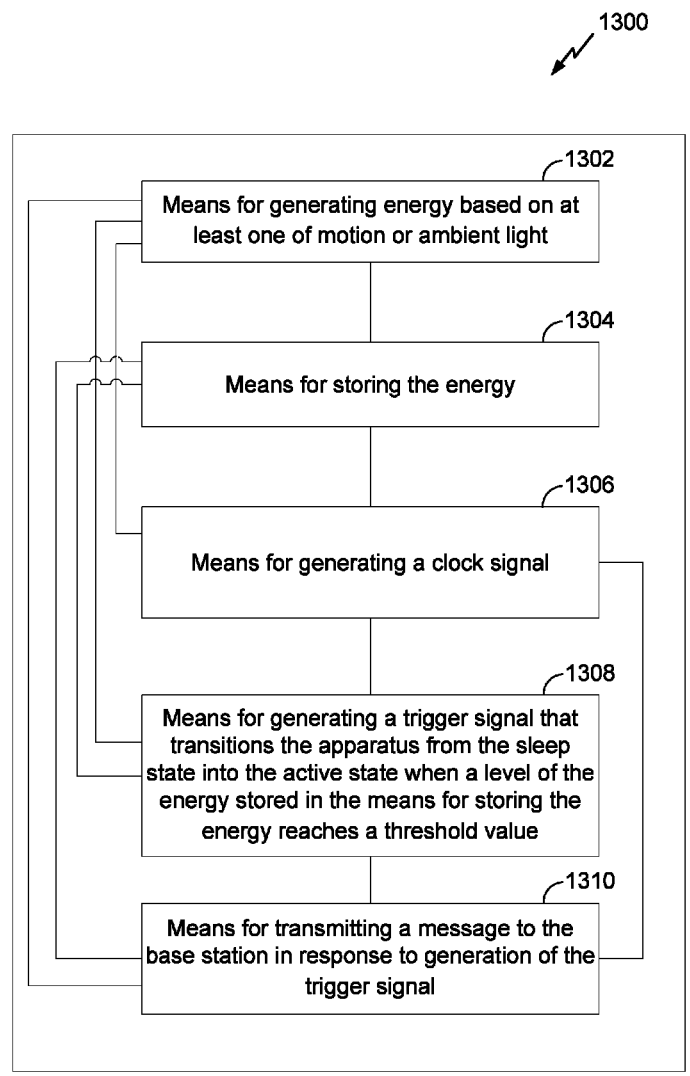
FIG. 13 is another functional block diagram of a station, in accordance with an exemplary embodiment.

FIG. 13 is another functional block diagram of a STA 1300, in accordance with an exemplary embodiment. STA 1300 comprises means 1302, means 1304, means 1306, means 1308, and means 1310 for the various actions discussed with respect to FIGS. 1-7B. The STA 1300 includes means 1302 for generating energy based on at least one of motion or ambient light. In an embodiment, means 1302 for generating energy based on at least one of motion or ambient light may be configured to perform one or more of the functions discussed above with respect to block 1202. The STA 1300 further includes means 1304 for storing the energy. In an embodiment, means 1304 for storing the energy may be configured to perform one or more of the functions discussed above with respect to block 1204. The STA 1300 includes means 1306 for generating a clock signal. In an embodiment, means 1306 for generating a clock signal may be configured to perform one or more of the functions discussed above with respect to block 1206.

The STA 1300 further includes means 1308 for generating a trigger signal that transitions the apparatus from the sleep state into the active state when a level of the energy stored in the means for storing the energy reaches a threshold value. In an embodiment, means 1308 for generating a trigger signal that transitions the apparatus from the sleep state into the active state when a level of the energy stored in the means for storing the energy reaches a threshold value may be configured to perform one or more of the functions discussed above with respect to block 1208. The STA 1300 further includes means 1310 for transmitting a message to the base station in response to generation of the trigger signal. In an embodiment, means 1310 for transmitting a message to the base station in response to generation of the trigger signal may be configured to perform one or more of the functions discussed above with respect to block 1210.

Figure 14:
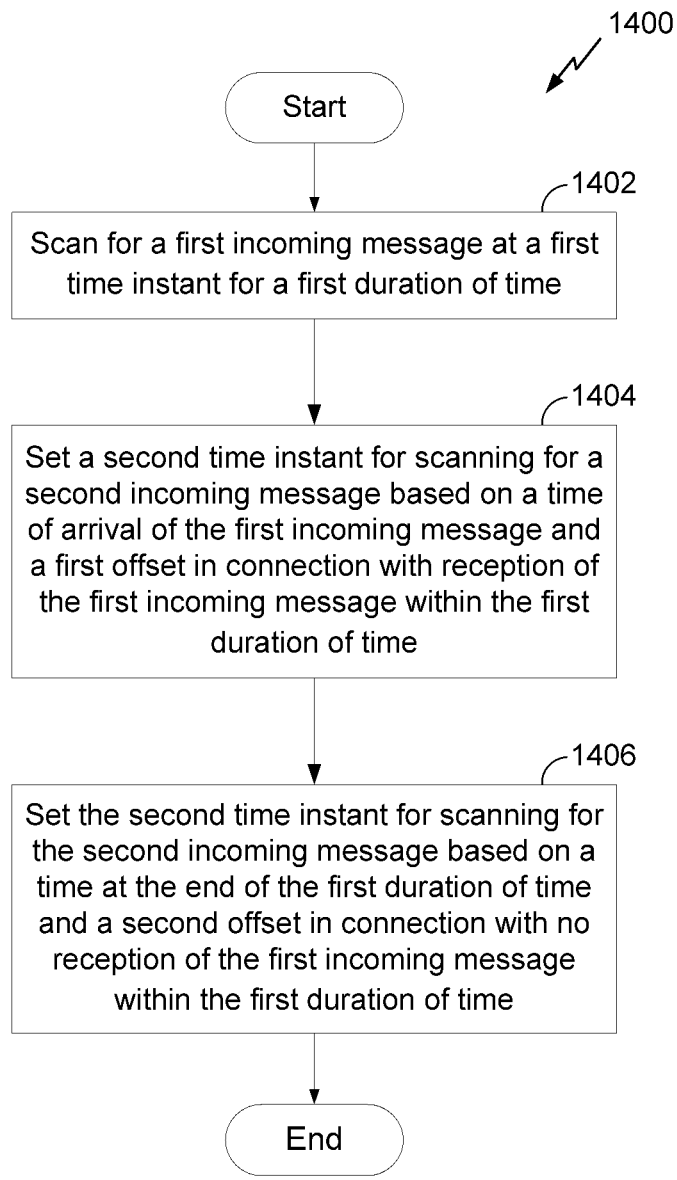
FIG. 14 is a flowchart of an exemplary method for communicating with a device.

FIG. 14 is a flowchart of an exemplary method 1400 for communicating with a device. In an embodiment, the steps in flowchart 1400 may be performed by the AP 104. Although the method of flowchart 1400 is described herein with reference to a particular order, in various embodiments, blocks herein may be performed in a different order, or omitted, and additional blocks may be added. A person having ordinary skill in the art will appreciate that the method of flowchart 1400 may be implemented in any device that may be configured to communicate with another device.

At block 1402, the AP 104 scans for a first incoming message at a first time instant for a first duration of time. At block 1404, a second time instant for scanning for a second incoming message is set based on a time of arrival of the first incoming message and a first offset in connection with reception of the first incoming message within the first duration of time. In an embodiment, the first offset is based on a minimum duration of time between successive transmissions of messages by the device.

At block 1406, the second time instant for scanning for the second incoming message is set based on a time at the end of the first duration of time and a second offset in connection with no reception of the first incoming message within the first duration of time. In an embodiment, the second offset is based on a minimum of the minimum duration of time between successive transmissions of messages by the device and a maximum duration of time that the device is expected to page a base station in order to establish a connection.

Figure 15:
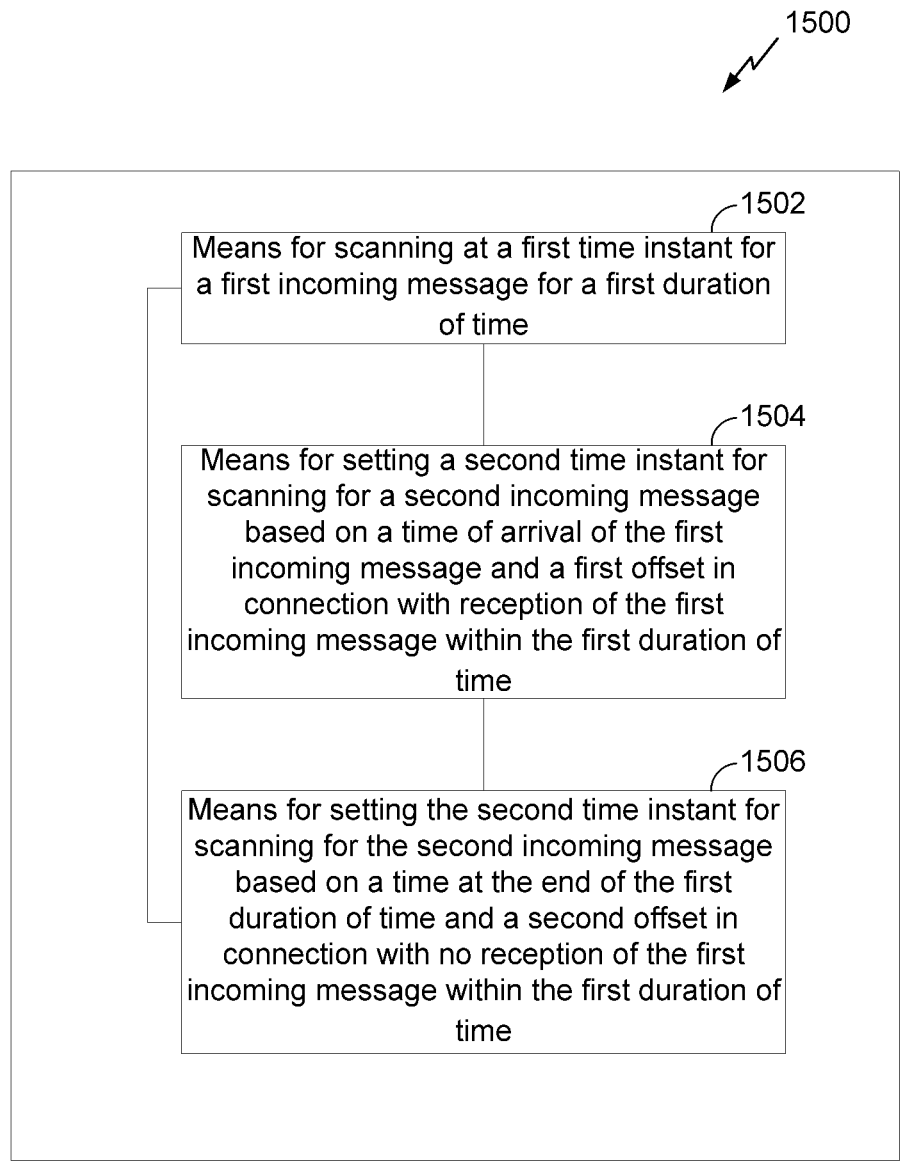
FIG. 15 is a functional block diagram of an access point, in accordance with an exemplary embodiment.

FIG. 15 is a functional block diagram of an AP 1500, in accordance with an exemplary embodiment. AP 1500 comprises means 1502, means 1504, and means 1506 for the various actions discussed with respect to FIGS. 8-9. The AP 1500 includes means 1502 for scanning for a first incoming message at a first time instant for a first duration of time. In an embodiment, means 1502 for scanning for a first incoming message at a first time instant for a first duration of time may be configured to perform one or more of the functions discussed above with respect to block 1402. The AP 1500 further includes means 1504 for setting a second time instant for scanning for a second incoming message based on a time of arrival of the first incoming message and a first offset in connection with reception of the first incoming message within the first duration of time. In an embodiment, means 1504 for setting a second time instant for scanning for a second incoming message based on a time of arrival of the first incoming message and a first offset in connection with reception of the first incoming message within the first duration of time may be configured to perform one or more of the functions discussed above with respect to block 1404.

The AP 1500 includes means 1506 for setting the second time instant for scanning for the second incoming message based on a time at the end of the first duration of time and a second offset in connection with reception of the first incoming message within the first duration of time. In an embodiment, means 1506 for setting the second time instant for scanning for the second incoming message based on a time at the end of the first duration of time and a second offset in connection with reception of the first incoming message within the first duration of time may be configured to perform one or more of the functions discussed above with respect to block 1406.

Figure 16:
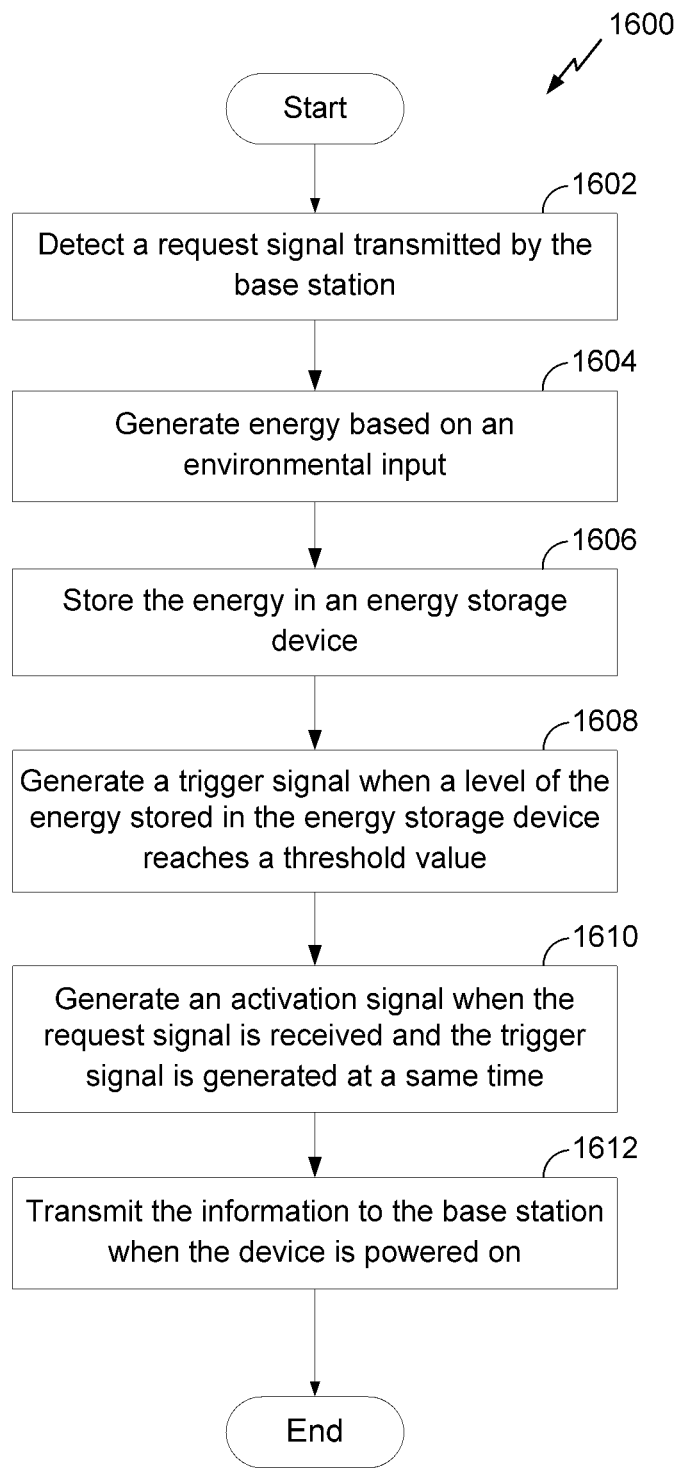
FIG. 16 is a flowchart of another exemplary method for communicating with a base station.

FIG. 16 is a flowchart of another exemplary method 1600 for communicating with a base station. In an embodiment, the steps in flowchart 1600 may be performed by the STA 106 (e.g., the wireless device 202). Although the method of flowchart 1600 is described herein with reference to a particular order, in various embodiments, blocks herein may be performed in a different order, or omitted, and additional blocks may be added. A person having ordinary skill in the art will appreciate that the method of flowchart 1600 may be implemented in any device that may be configured to communicate with another device.

At block 1602, a request signal transmitted by the base station is detected. In an embodiment, the request signal comprises a request for information determined by the STA 106. At block 1604, energy is generated based on an environmental input. At block 1606, the energy is stored in an energy storage device.

At block 1608, a trigger signal is generated when a level of the energy stored in the energy storage device reaches a threshold value. At block 1610, an activation signal is generated when the request signal is received and the trigger signal is generated at a same time. At block 1612, the information is transmitted to the base station when the device is powered on.

Figure 17:
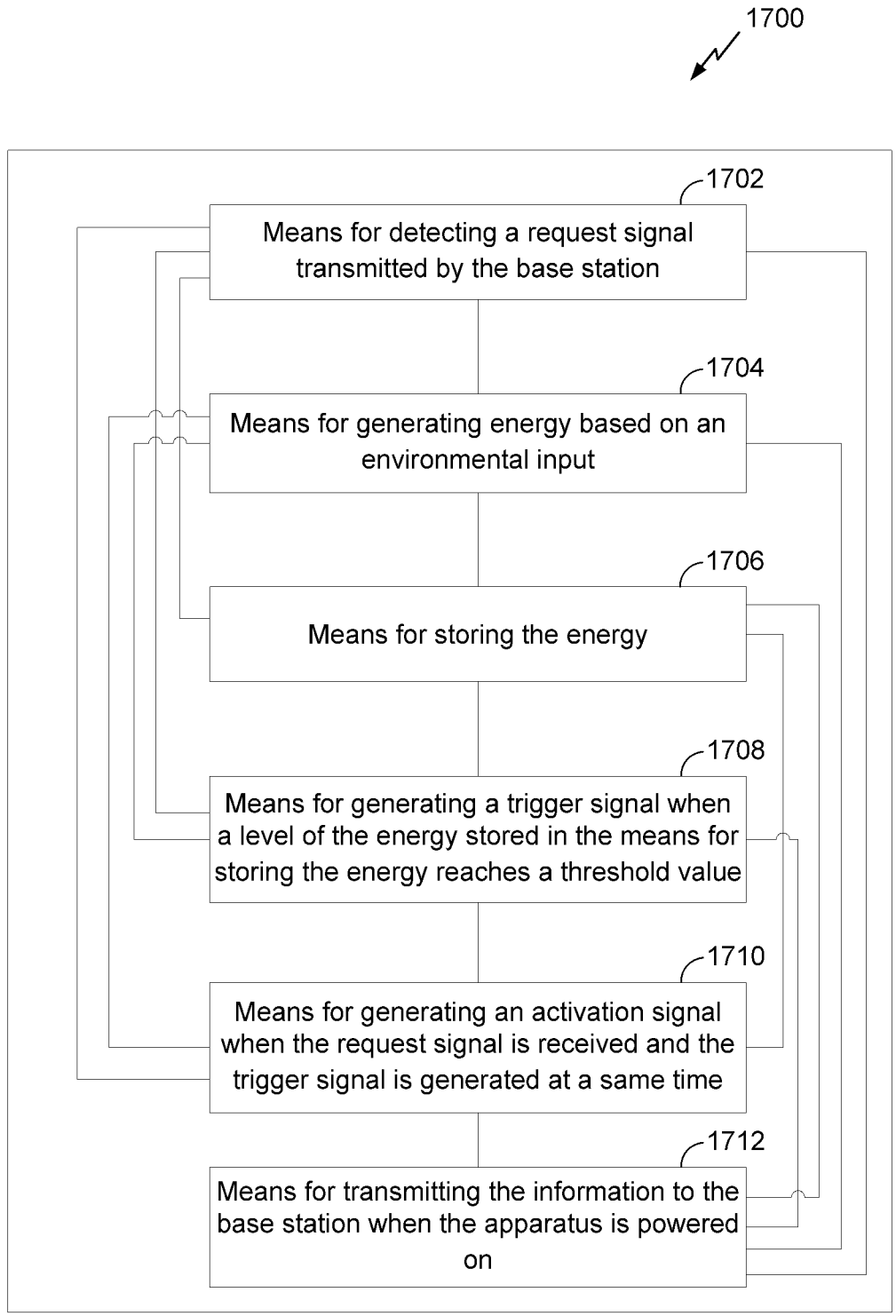
FIG. 17 is another functional block diagram of a station, in accordance with an exemplary embodiment.

FIG. 17 is another functional block diagram of a STA 1700, in accordance with an exemplary embodiment. STA 1700 comprises means 1702, means 1704, means 1706, means 1708, means 1710, and means 1712 for the various actions discussed herein. The STA 1700 includes means 1702 for detecting a request signal transmitted by the base station. In an embodiment, means 1702 for detecting a request signal transmitted by the base station may be configured to perform one or more of the functions discussed above with respect to block 1602. The STA 1700 further includes means 1704 for generating energy based on an environmental input. In an embodiment, means 1704 for generating energy based on an environmental input may be configured to perform one or more of the functions discussed above with respect to block 1604. The STA 1700 includes means 1706 for storing the energy. In an embodiment, means 1706 for storing the energy may be configured to perform one or more of the functions discussed above with respect to block 1606.

The STA 1700 further includes means 1708 for generating a trigger signal when a level of the energy stored in the means for storing the energy reaches a threshold value. In an embodiment, means 1708 for generating a trigger signal when a level of the energy stored in the means for storing the energy reaches a threshold value may be configured to perform one or more of the functions discussed above with respect to block 1608. The STA 1700 further includes means 1710 for generating an activation signal when the request signal is received and the trigger signal is generated at a same time. In an embodiment, means 1710 for generating an activation signal when the request signal is received and the trigger signal is generated at a same time may be configured to perform one or more of the functions discussed above with respect to block 1610. The STA 1700 further includes means 1712 for transmitting the information to the base station when the apparatus is powered on. In an embodiment, means 1712 for transmitting the information to the base station when the apparatus is powered on may be configured to perform one or more of the functions discussed above with respect to block 1612.

Figure 18:
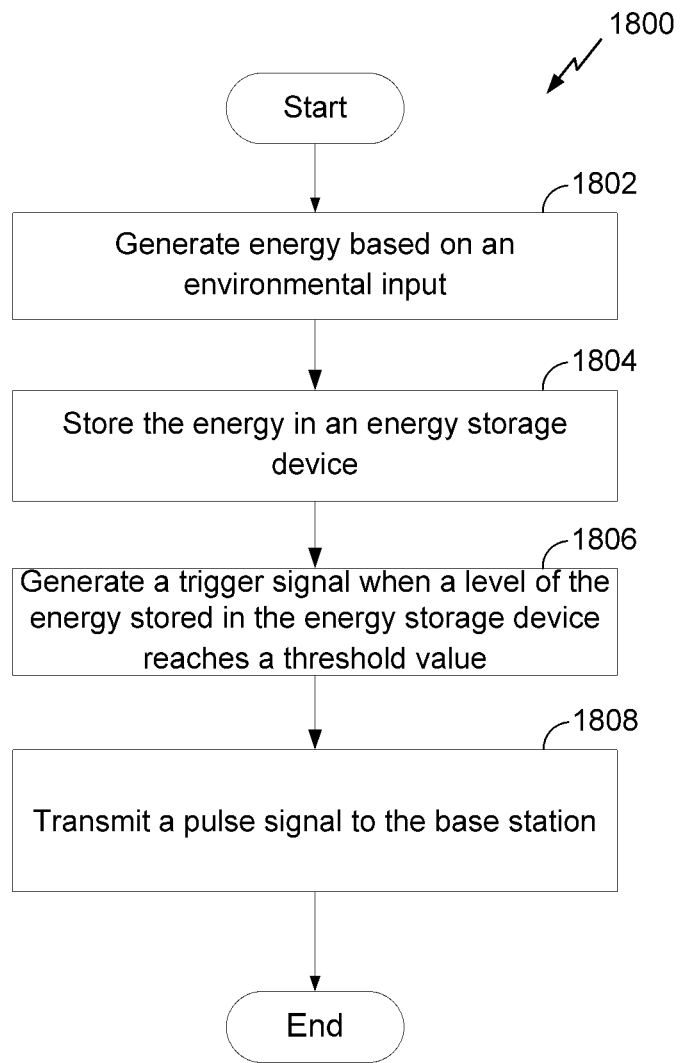
FIG. 18 is a flowchart of another exemplary method for communicating with a base station.

FIG. 18 is a flowchart of another exemplary method 1800 for communicating with a base station. In an embodiment, the steps in flowchart 1800 may be performed by the STA 106 (e.g., the wireless device 202). Although the method of flowchart 1800 is described herein with reference to a particular order, in various embodiments, blocks herein may be performed in a different order, or omitted, and additional blocks may be added. A person having ordinary skill in the art will appreciate that the method of flowchart 1800 may be implemented in any device that may be configured to communicate with another device.

At block 1802, energy based on an environmental input is generated. At block 1804, the energy is stored in an energy storage device. At block 1806, a trigger signal is generated when a level of the energy stored in the energy storage device reaches a threshold value. At block 1808, a pulse signal is transmitted to the base station. In an embodiment, the base station comprises a receiver and the base station powers on the receiver in response to receiving the pulse signal such that the base station can receive additional messages from the STA 106.

Figure 19:
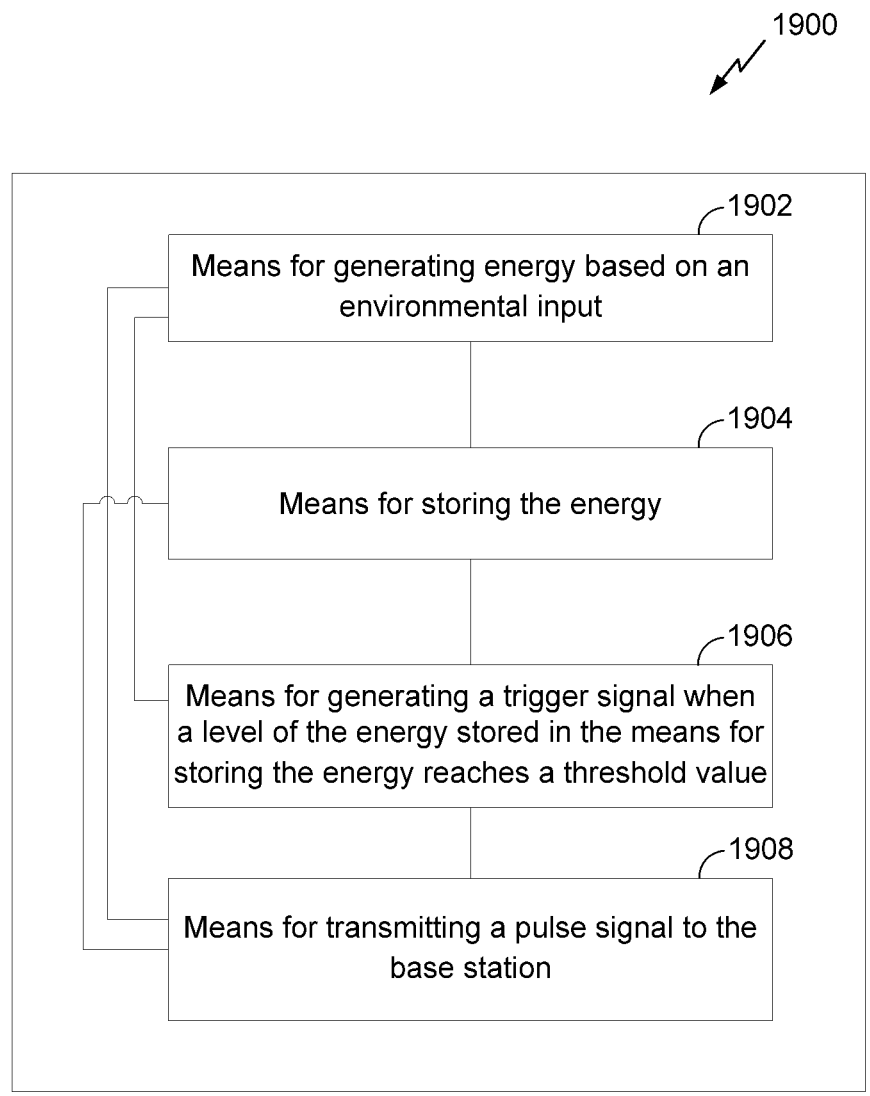
FIG. 19 is another functional block diagram of a station, in accordance with an exemplary embodiment.

FIG. 19 is another functional block diagram of a STA 1900, in accordance with an exemplary embodiment. STA 1900 comprises means 1902, means 1904, means 1906, and means 1908 for the various actions discussed herein. The STA 1900 includes means 1902 for generating energy based on an environmental input. In an embodiment, means 1902 for generating energy based on an environmental input may be configured to perform one or more of the functions discussed above with respect to block 1802. The STA 1900 further includes means 1904 for storing the energy. In an embodiment, means 1904 for storing the energy may be configured to perform one or more of the functions discussed above with respect to block 1804.

The STA 1900 further includes means 1906 for generating a trigger signal when a level of the energy stored in the means for storing the energy reaches a threshold value. In an embodiment, means 1906 for generating a trigger signal when a level of the energy stored in the means for storing the energy reaches a threshold value may be configured to perform one or more of the functions discussed above with respect to block 1806. The STA 1900 further includes means 1908 for transmitting a pulse signal to the base station. In an embodiment, means 1908 for transmitting a pulse signal to the base station may be configured to perform one or more of the functions discussed above with respect to block 1808.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. The means for generating energy comprises the energy generation block 302A and/or the energy generation block 302B. The means for storing the energy comprises the charging capacitor 316. The means for generating a clock signal comprises the clock circuit 602 and/or the clock and timer circuit 653. The means for transmitting comprises the transmitter 210 of the STA 106. The means for generating a trigger signal comprises the trigger 320. The means for scanning comprises the receiver 212 of the AP 104. The means for setting the second time instant comprises the processor 204 of the AP 104. The means for generating the activation signal comprises a logical element, such as an AND gate.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device for communicating with a base station, comprising:
    a circuit configured to generate energy based on an environmental input;
    an energy storage device coupled to the circuit and configured to store the energy;
    a clock circuit configured to generate a clock signal, the clock circuit configured to be powered on during an active state of the device and configured to be powered off during a sleep state of the device;
    a trigger circuit coupled to the energy storage device, the trigger circuit configured to generate a trigger signal that transitions the device from the sleep state into the active state when a level of the energy stored in the energy storage device reaches a threshold value;
    a transmitter coupled to the clock circuit, the transmitter configured to receive the clock signal and transmit a message to the base station in response to the generation of the trigger signal; and
    a receiver configured to receive an indication of a current time from the base station, the indication of the current time used by the device to communicate with a second base station.

2. The device of claim 1, wherein the environmental input comprises at least one of motion of the device or ambient light.

3. The device of claim 2, wherein the circuit comprises at least one of a magnet and a coil or a photovoltaic cell, wherein motion of the device causes an alternating current (AC) to be induced in the coil based on an oscillation of the magnet, and wherein a current is generated by the photovoltaic cell when the photovoltaic cell is exposed to ambient light.

4. The device of claim 1, wherein the trigger signal is a pulse signal.

5. The device of claim 4, further comprising:
    a power source; and
    a switch coupled between the clock circuit and the power source, wherein the switch is closed when the pulse signal is generated.

6. The device of claim 1, wherein the second base station is a global positioning system.

7. A method of communicating with a base station, comprising:
    generating energy based on an environmental input;
    storing the energy in an energy storage device;
    generating a clock signal when a clock circuit is powered on, the clock circuit configured to be powered on during an active state and configured to be powered off during a sleep state;
    generating a trigger signal to operate in the active state when a level of the energy stored in the energy storage device reaches a threshold value;
    transmitting a message to the base station based on the clock signal in response to the generating the trigger signal; and
    receiving an indication of a current time from the base station, the indication of the current time used to communicate with a second base station.

8. The method of claim 7, wherein generating energy comprises generating energy based on at least one of motion or ambient light.

9. The method of claim 8, wherein generating energy based on at least one of motion or ambient light comprises inducing an alternating current (AC) in a coil based on an oscillation of a magnet.

10. The method of claim 8, wherein generating energy based on at least one of motion or ambient light comprises generating a current when a photovoltaic cell is exposed to the ambient light.

11. The method of claim 7, wherein the trigger signal is a pulse signal.

12. The method of claim 7, further comprising closing a switch coupled between a power source and the clock circuit when the level of the energy stored in the energy storage devices reaches the threshold value.

13. The method of claim 7, wherein the second base station is a global positioning system.

14. An apparatus for communicating with a base station, comprising:
   means for generating energy based on an environmental input;
   means for storing the energy;
   means for generating a clock signal when the means for generating the clock signal is powered on, the means for generating the clock signal configured to be powered on during an active state of the apparatus and configured to be powered off during a sleep state of the apparatus;
   means for generating a trigger signal that transitions the apparatus from the sleep state into the active state when a level of the energy stored in the means for storing the energy reaches a threshold value;
   means for transmitting a message to the base station based on the clock signal in response to generation of the trigger signal; and
   means for receiving an indication of a current time from the base station, the indication of the current time used by the apparatus to communicate with a second base station.

15. The apparatus of claim 14, wherein means for generating energy comprises means for generating energy based on at least one of motion or ambient light.

16. The apparatus of claim 15, wherein means for generating energy based on at least one of motion or ambient light comprises means for inducing an alternating current (AC) in a coil based on an oscillation of a magnet.

17. The apparatus of claim 15, wherein means for generating energy based on at least one of motion or ambient light comprises means for generating a current when a photovoltaic cell is exposed to the ambient light.

18. The apparatus of claim 14, wherein the trigger signal is a pulse signal.

19. The apparatus of claim 14, further comprising means for closing a switch coupled between a power source and the means for generating the clock signal when the level of the energy stored in the means for storing the energy reaches the threshold value.

20. The apparatus of claim 14, wherein the second base station is a global positioning system.

21. The apparatus of claim 14, wherein the means for generating energy comprises an energy generation block, wherein the means for storing the energy comprises an energy storage device, wherein the means for generating a clock signal comprises a clock circuit, wherein the means for generating the trigger signal comprises a trigger circuit, and wherein the means for transmitting comprises a transmitter.

22. A non-transitory computer-readable medium comprising code that, when executed, causes an apparatus to:
   generate energy based on an environmental input;
   store the energy in an energy storage device;
   generate a clock signal when a clock circuit is powered on, the clock circuit configured to be powered on during an active state of the apparatus and configured to be powered off during a sleep state of the apparatus;
   generate a trigger signal to transition the apparatus from the sleep state into the active state when a level of the energy stored in the energy storage device reaches a threshold value;
   transmit a message to the base station based on the clock signal in response to generation of the trigger signal; and
   receive an indication of a current time from the base station, the indication of the current time is used by the apparatus to communicate with a second base station.

23. The medium of claim 22, further comprising code that, when executed, causes an apparatus to generate energy based on at least one of motion or ambient light.

24. The medium of claim 23, further comprising code that, when executed, causes an apparatus to induce an alternating current (AC) in a coil based on an oscillation of a magnet.

25. The medium of claim 23, further comprising code that, when executed, causes an apparatus to generate a current when a photovoltaic cell is exposed to the ambient light.

26. The medium of claim 22, wherein the trigger signal is a pulse signal.

27. The medium of claim 22, further comprising code that, when executed, causes an apparatus to close a switch coupled between a power source and the clock circuit when the level of the energy stored in the means for storing energy reaches the threshold value.

28. The medium of claim 22, wherein the second base station is a global positioning system.

29. A device for communicating with a base station, comprising:
   a circuit configured to generate energy based on at least one of motion of the device or ambient light;
   an energy storage device coupled to the circuit and configured to store the energy;
   a clock circuit configured to generate a clock signal, the clock circuit configured to operate at a first power level during an active state of the device and configured to operate at a second power level that is less than the first power level and greater than zero watts during a sleep state of the device;
   a trigger circuit coupled to the energy storage device, the trigger circuit configured to generate a trigger signal that transitions the device from the sleep state into the active state when a level of the energy stored in the energy storage device reaches a threshold value; and
   a transmitter configured to transmit a message to the base station in response to the generation of the trigger signal.

30. A base station for communicating with a device, comprising:
   a receiver configured to scan for a first incoming message at a first time instant for a first duration of time; and
   a processor configured to set a second time instant for scanning for a second incoming message, the second time instant based on a time of arrival of the first incoming message and a first offset in connection with reception of the first incoming message within the first duration of time, the first offset based on a minimum duration of time between successive transmissions of messages by the device, the second time instant based on a time at the end of the first duration of time and a second offset in connection with no reception of the first incoming message within the first duration of time, the second offset based on a minimum of the minimum duration of time between successive transmissions of messages by the device and a maximum duration of time that the device is expected to page the base station in order to establish a connection.

31. A device for communicating with a base station, comprising:
- a receiver configured to detect a request signal transmitted by the base station, the request signal comprising a request for information determined by the device when the device is powered on;
- a circuit configured to generate energy based on an environmental input;
- an energy storage device coupled to the circuit and configured to store the energy;
- a trigger circuit coupled to the energy storage device, the trigger circuit configured to generate a trigger signal when a level of the energy stored in the energy storage device reaches a threshold value;
- a logical element coupled to the receiver and the trigger circuit, the logical element configured to generate an activation signal when the request signal is received and the trigger signal is generated at a same time, the activation signal configured to power on the device; and
- a transmitter configured to transmit the information to the base station when the device is powered on, the receiver further configured to receive an indication of a current time from the base station, the indication of the current time used by the device to communicate with a second base station.

32. A device for communicating with a base station, comprising:
- a circuit configured to generate energy based on an environmental input;
- an energy storage device coupled to the circuit and configured to store the energy;
- a trigger circuit coupled to the energy storage device, the trigger circuit configured to generate a trigger signal when a level of the energy stored in the energy storage device reaches a threshold value;
- a transmitter coupled to the trigger circuit and configured to transmit a pulse signal to the base station, the base station comprising a receiver, the base station powering on the receiver in response to receiving the pulse signal; and
- a second receiver configured to receive an indication of a current time from the base station, the indication of the current time used by the device to communicate with a second base station.

\* \* \* \* \*